United States Patent
Jacobson et al.

(10) Patent No.: US 10,643,399 B2
(45) Date of Patent: May 5, 2020

(54) PHOTOREALISTIC SCENE GENERATION SYSTEM AND METHOD

(71) Applicant: TARGET BRANDS, INC., Minneapolis, MN (US)

(72) Inventors: Tammy Jacobson, Minneapolis, MN (US); Alessandro Miralles, Minneapolis, MN (US); Michael Whitacre, Minneapoilis, MN (US)

(73) Assignee: TARGET BRANDS, INC., Minneapolis, MN (US)

(*) Notice: Subject to any disclaimer, the term of this patent is extended or adjusted under 35 U.S.C. 154(b) by 3 days.

(21) Appl. No.: 16/114,766

(22) Filed: Aug. 28, 2018

(65) Prior Publication Data

US 2019/0066389 A1 Feb. 28, 2019

Related U.S. Application Data

(60) Provisional application No. 62/551,464, filed on Aug. 29, 2017.

(51) Int. Cl.
*G06T 19/20* (2011.01)
*G06F 3/0481* (2013.01)
(Continued)

(52) U.S. Cl.
CPC ............ *G06T 19/20* (2013.01); *G02B 27/017* (2013.01); *G06F 3/011* (2013.01);
(Continued)

(58) Field of Classification Search
CPC .................................................. G06T 19/20
See application file for complete search history.

(56) References Cited

U.S. PATENT DOCUMENTS 6,727,925 B1  4/2004  Bourdelais
7,062,722 B1  6/2006  Carlin et al.
(Continued)

OTHER PUBLICATIONS

"IKEA Launches Pilot Virtual Reality (VR) Kitchen Experience for HTC Vive on Steam", printed from www.ikea.com/us/en/about_ikea/newsitem/040516_Virtual-Reality, posted on Apr. 4, 2016 (2 pages).

(Continued)

*Primary Examiner* — Phi Hoang
(74) *Attorney, Agent, or Firm* — JoAnn M. Seaton; Griffiths & Seaton PLLC

(57) ABSTRACT

A photorealistic scene generation system includes a virtual reality (VR) headset, a VR controller, and a VR processor. The VR headset visually presents a user with a 3D virtual environment. The VR controller receives input from the user. The VR processor communicates with the VR headset and the VR controller and instructs the VR headset to display the 3D virtual environment having an interactive vantage point based on movement of the user based on positional data received from the VR headset and instructs the VR headset to display a source zone superimposed over the 3D virtual environment. The source zone provides visual representations of physical items previously selected for use in styling the 3D virtual environment. The VR processor is programmed to direct movement of one of the visual representations from the source zone and to move the selected one of the visual representations into the 3D virtual environment.

19 Claims, 18 Drawing Sheets

(51) Int. Cl.
　　　*G02B 27/01*　　　(2006.01)
　　　*G06F 3/01*　　　(2006.01)
(52) U.S. Cl.
　　　CPC ...... *G06F 3/04815* (2013.01); *G06T 2210/04* (2013.01); *G06T 2219/2016* (2013.01)

(56) References Cited

U.S. PATENT DOCUMENTS

| | | | |
|---|---|---|---|
| 10,181,218 B1* | 1/2019 | Goetzinger, Jr. | G06Q 30/0643 |
| 2005/0081161 A1 | 4/2005 | MacInnes et al. | |
| 2007/0156540 A1* | 7/2007 | Koren | G06Q 10/087 |
| | | | 705/14.51 |
| 2008/0162261 A1 | 7/2008 | Velazquez et al. | |
| 2009/0113349 A1* | 4/2009 | Zohar | G06Q 30/00 |
| | | | 715/852 |
| 2014/0236541 A1 | 8/2014 | Lee | |
| 2015/0302426 A1 | 10/2015 | Rogers et al. | |
| 2016/0077547 A1 | 3/2016 | Aimone et al. | |
| 2016/0314562 A1* | 10/2016 | Sakamoto | G06F 1/163 |
| 2017/0148090 A1* | 5/2017 | Davi | G06Q 30/06 |
| 2018/0322669 A1* | 11/2018 | Elliott | G06T 11/60 |
| 2018/0374276 A1* | 12/2018 | Powers | G06T 15/10 |
| 2019/0164340 A1* | 5/2019 | Pejic | G06K 9/00476 |

OTHER PUBLICATIONS

"A Quick Guide to Bringing Your Vision to Virtual Reality", printed from www.yulio.com/create/get-started/, publicly available at least as early as Sep. 26, 2016 (2 pages).

* cited by examiner

US 10,643,399 B2

PHOTOREALISTIC SCENE GENERATION SYSTEM AND METHOD

CROSS-REFERENCE TO RELATED APPLICATION

This application is a non-provisional application of and claims priority under 35 U.S.C. § 119 to U.S. Provisional Patent Application No. 62/551,464, filed Aug. 29, 2017, which is incorporated herein by reference.

BACKGROUND OF THE INVENTION

Scenes, product compositions, product depictions, and other product images are increasingly used in advertising, signage, instructional documents, descriptions, etc. Creation of the scenes, product compositions, product depictions, or product images are often large-scale productions requiring large number of steps, individuals, time, and therefore, money to complete. For example, to create a scene for an advertising campaign, a stylist or other individual selects an existing scene or designs the background scene, purchases or selects products and surrounding items from retail venues, warehouses, or similar, and makes other choices regarding available products for the scene.

Other individuals locate the items selected by the stylist, load the items for transport, and transport the items to a photography space or studio. The stylist directs additional individuals in placing items in an initial desired manner to create a physical scene to be photographed. Often times, once the original scene is created, additional incremental or other changes are made to the scene to adjust the look and feel of the images captured of the scene, depending upon the desired end use of the captured images. In addition, the captured photographs may be updated using photo-editing software to achieve the desired end results. Even when conducted in an expedited manner, the design and creation of a photographed scene suitable for use in any medium can take days, weeks, or even longer. As such, means for more rapidly and efficiently creating images for use in advertising, signage, instructional documents, descriptions, etc. are desired.

SUMMARY

One embodiment of the present invention relates to a photorealistic scene generation system includes a virtual reality (VR) headset, a VR controller, and a VR processor. The VR headset is configured to visually present a user with a three-dimensional (3D) virtual environment. The VR controller is separate from the VR headset and is configured to receive input from the user during user interaction with the 3D virtual environment as viewed through the VR headset. The VR processor is in communication with the VR headset and the VR controller and is programmed to instruct the VR headset to display the 3D virtual environment having an interactive vantage point based on movement of a head of the user based on positional data received from the VR headset and instruct the VR headset to display a source zone superimposed over the 3D virtual environment to the user via the VR headset, wherein the source zone provides visual representations of physical items previously selected for use in styling the 3D virtual environment. The VR processor is further programmed to receive input from the VR controller to select and direct movement of one of the visual representations from the source zone and to move the selected one of the visual representations into the 3D virtual environment, convert the selected one of the visual representations into a 3D image of an item corresponding to the selected one of the visual representations as the visual representation is moved from the source zone into the 3D virtual environment, and, in real time, adjust the orientation and placement of the 3D image within the 3D virtual environment to have an orientation and positional placement as directed by input from the VR controller. Other systems, methods, and associated computer readable medium are also described herein.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. In addition, as used herein, the term "about" or "substantially" applies to all numeric values or descriptive terms, respectively, and generally indicate a range of numbers or characteristics that one of skill in the art would consider equivalent to the recited values or terms, that is, having the same function or results.

This innovation provides a virtual scene styling system for building an entire photorealistic scene built of three-dimensional photogrammetry images of items including, in one example, products being offered for sale and/or other scene props. More specifically, in one embodiment, a stylist uses a virtual reality controller to place chunk or less-refined versions of each of the three-dimensional photogrammetry images, otherwise referred to as three-dimensional photogrammetry models, in a virtual scene. No specialized software or programmer training of the stylist is typically necessary. Once the stylist has placed all items as desired, the chunk versions of each of the three-dimensional photogrammetry images are replaced with refined, photorealistic images, otherwise referred to as photorealistic models, corresponding thereto to create an overall scene formed of photorealistic images collectively creating a photorealistic scene suitable for use in advertising, signage, promotional materials, sales materials, etc. In one example, the created photorealistic scenes are nearly identical to or substantially indistinguishable from actual photographed scenes, at least as observed by a typical consumer viewer. In one embodiment, once a photorealistic scene is created, two-dimensional photo-like images can be captured of the photorealistic scene or portions thereof from any variety of angles, vantage points, etc. As used herein, it should be understood that the term "photorealistic" means generally appearing to an ordinarily observer as a photographed version thereof, and does not require absolute photorealism.

Figure 1:
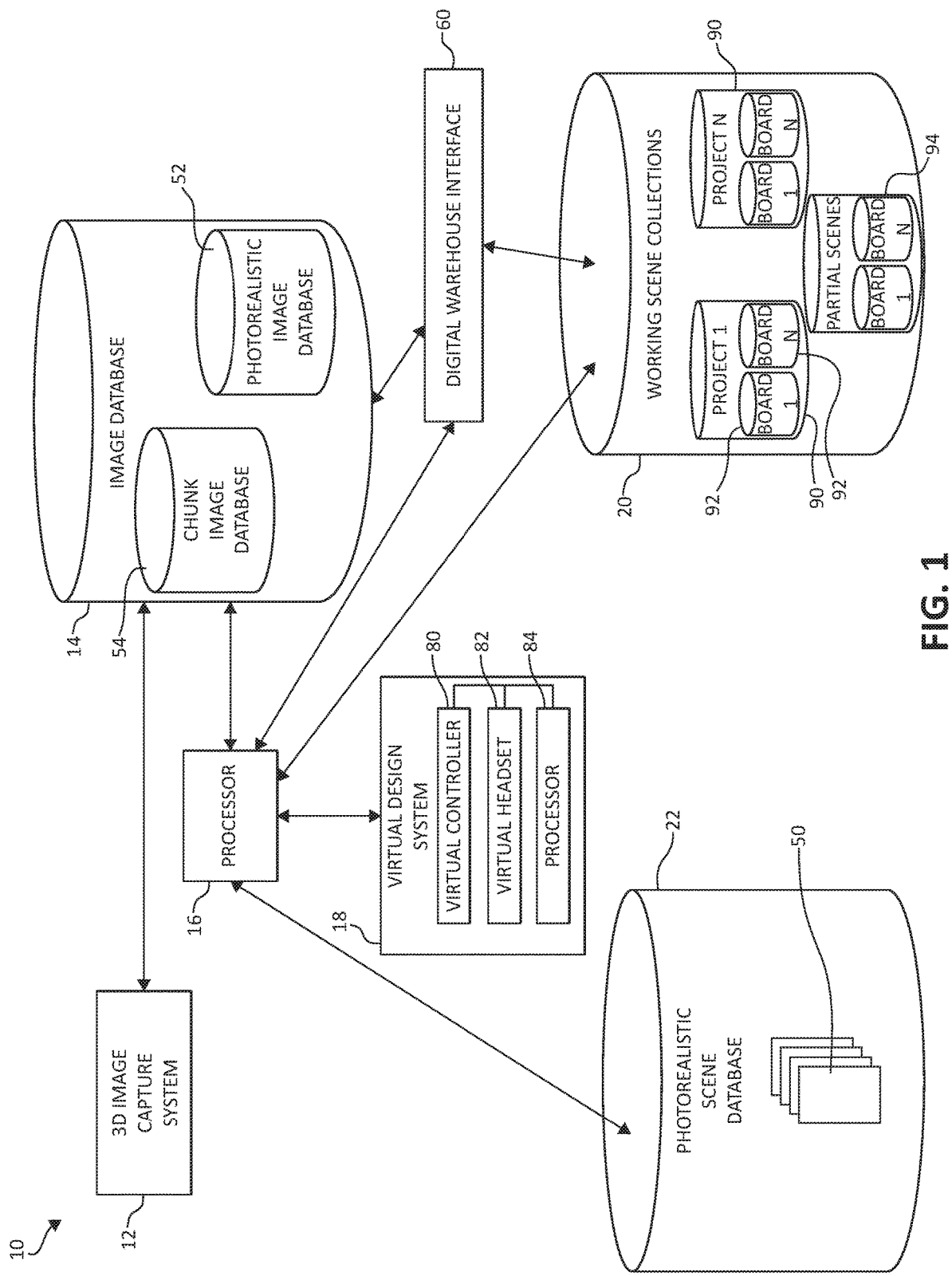
FIG. 1 is schematic illustration of a photorealistic scene generation system, according to one embodiment of the present invention.

Turning to the figures, FIG. 1 illustrates a schematic illustration of a photorealistic scene generation system 10. In one embodiment, photorealistic scene generation system 10 includes a three-dimensional (3D) image capture system 12, a 3D model database 14, a processor 16, a virtual design system 18, a working scene collections database 20, and a photorealistic scene database 22. In general, processor 16 assists in using three-dimensional images, otherwise referred to as 3D models, generated using 3D image capture system 12, stored in 3D image database 14 with a virtual design system 18 to create a photorealistic scene 50 for use in various print and digital presentations as desired.

3D image capture system 12 is any suitable system for creating 3D images. In one example, 3D image capture system 12 collects a large number of two-dimensional images of an item or asset from each of a plurality of positions and/or vantage points and stitches the images together using suitable photogrammetry software to create a three-dimensional image representation, such as a photorealistic image, of the item.

Photorealistic images of individual items, such as products, utensils, pans, artwork, furniture, home décor, architectural items, clothing, jewelry, etc. as created by 3D image capture system 12 and/or from other source, such as preexisting photorealistic image library, etc., are stored in a photorealistic image database 52 of 3D image database 14. In one embodiment, processor 16 additionally converts the photorealistic images of each individual item into a chunk image also corresponding to the same individual item. The chunk image of each item generally fully represents the overall shape and form of an image, but has less detail, shading, texture, etc. than the corresponding, complete photorealistic image. In this manner, chunk images are defined using considerably less computing storage space than the corresponding, complete photorealistic images of the item. The chunk images are stored to chunk image database 54 of 3D image database 14 for future use.

Processor 16 is any suitable computing device or devices known in the art or developed in the future capable of receiving processing images, interfaces, database files, input therefrom, etc. from other portions of photorealistic scene generation system 10. That is, processor 16 may be a portion of and/or be used in combination with a server, a desktop computer, a laptop computer, a tablet, a smartphone, and the like computing devices and/or is configured to communicate with other portions of photorealistic scene generation system 10 via a network. While processor 16 may be a single processor, it should be understood that processor 16 may alternatively comprise any number of processors 16 working in combination.

The network allowing processor 16 to communication with each of one or more of 3D image capture system 12, 3D image database 14, virtual design system 18, working scene collections database 20, photorealistic scene database 22, or other components of photorealistic scene generation system 10 may be any suitable wired and/or wireless network known in the art or developed in the future that enables processor 16 to communicate with other portions of photorealistic scene generation system 10. Examples of suitable networks include, but are not limited to, a local area network (LAN), a wireless local area network (WLAN), a wide area network (WAN), the Internet, personal area network (PAN), enterprise private network (EPN), virtual private network (VPN), metropolitan area network (MAN), the world wide web, and the like networks and/or combinations thereof.

In one example, a user, such as a stylist, communicates with processor 16 via a digital warehouse 60. In general, digital warehouse 60 allows for a user to peruse 3D image database 14, working scene collections database 20, and/or photorealistic scene database 22, and select components and/or portions of a photorealistic scene 50 and/or options therefor. In one example, digital warehouse 60 is a web-based interface allowing remote and/or local users to select images for use in generating photorealistic scene 50 over a network such as the Internet, intranet, local network, etc. One example of a web-based version of digital warehouse 60 will be further described in combination with a method of creating photorealistic scene 50 below.

Working scene collections database 20 stores fully or partially completed photorealistic scenes 50 and/or chunk versions of the same scenes for reference in generating a new or derivative photorealistic scenes 50, for picking components thereof for use in a new or derivative photorealistic scene 50, etc. In one embodiment, working scene collections database 20 includes project 90 data and or working boards 92 thereof including collections of images, etc. selected by user, for example, via digital warehouse 60 for future or concurrent use, as will be further described below. In a similar manner, photorealistic scene database 22 stores fully completed photorealistic scenes 50, for example, photorealistic scenes 50 derived per the methods described in additional detail below.

Virtual design system 18 is generally configured to allow for selected image components to be chosen and/or placed for inclusion in creation of a photorealistic scene 50 using virtual reality components. In one embodiment, virtual design system 18 is configured to use virtual reality for scene generation. As used herein, virtual reality refers to computer technologies to simulate a user's presence in a virtual or imaginary environment. In virtual design system 18, a user is able to look and move around the artificial environment and interact with components therein. In this manner, a stylist or other individual is able to interact with virtual design system 18 to arrange images for use in a photorealistic scene 50 with very little, if any training, that is without programming or other particular software interaction or knowledge. In one embodiment, virtual design system 18 includes a virtual reality controller 80, such as one or more virtual reality controller handsets, a virtual reality headset 82, and a processor 84. Additional details regarding virtual design system 18 will be further described below in connection with the related method.

In one embodiment, working scene collections database 20 includes created projects 90 and one or more working boards 92. Each working board 92 includes a grouping of items previously selected for possible inclusion in photorealistic scenes 50 being created, and/or saved versions of in-process scenes. In one example, at least some of photorealistic scenes 50 are created using individual images selected from 3D image database 14 as selected and grouped into working boards 92, where each working board 92 is used to create one or more photorealistic scene 50. In one embodiment, a group of working boards 92 are arranged into projects 90, such as a particular advertising campaign, a circular, a group of store signs, etc. Organization of working boards 92 into projects 90 aids users/stylists in finding in progress working boards 92 and/or previously created working boards 92 as will be further described below.

Figure 2:
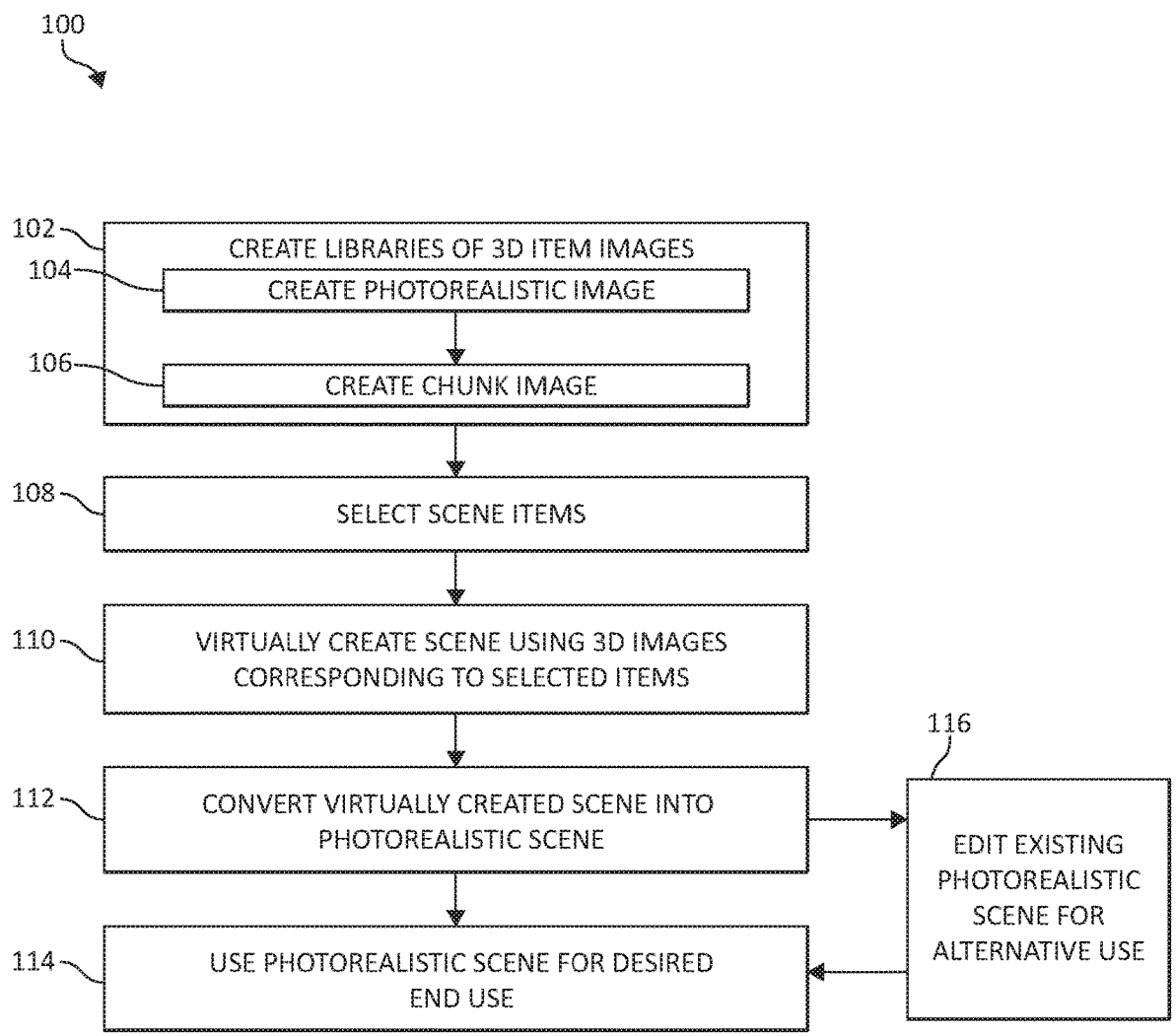
FIG. 2 is a flow chart illustration of a method of generating a photorealistic scene, according to one embodiment of the present invention.

FIG. 2 illustrates a method of creating a photorealistic scene 100, according to one embodiment of the present invention. At 102, libraries of 3D item images are created using any suitable method, such as those described above, to create a photorealistic 3D image of an item at 104. In one embodiment, at 106, processor 16 accesses each photorealistic image from photorealistic image database 52 and converts the same to a less refined chunk version of the photorealistic image, that is a chunk image for storage in chunk image database 54. In another embodiment, 3D image capture system 12 generates the chunk image in concert or in series with creation of the photorealistic images and saves both to 3D image database 14, that is, to chunk image database 54 and photorealistic image database 52, respectively. Photorealistic images serve as the building blocks for creating photorealistic scenes 50 with chunk images serving as working surrogates therefore allowing for faster processing times, etc., more particularly, due to smaller amount of memory and processing speed used in manipulating, moving, and placing the less-refined, chunk images as compared to detailed, photorealistic images for each item, less processor speed and capacity of processor 16 are used during initial arrangement of a scene.

At 108, items, or more particularly, corresponding images thereof, are selected for possible inclusion in a photorealistic scene 50. In one example, digital warehouse 60 is utilized to facilitate such creation. Example user interface screens 120, 150, 170, 190, and 210 for user interaction with digital warehouse 60 are illustrated in FIGS. 3-7, with other interface screens and/or organizations thereof also being contemplated. Interface screen 120 represents an early stage of selection item images at 108 and presents the user, such as a scene stylist, with categories and subcategories of images to facilitate the user in locating particular images and/or in building a scene from a blank slate.

For example, user interface screen 120 includes a 3D assets category button 122, a physical assets category button 124, and a sample assets button 126. The 3D assets category includes of item images corresponding to partial models of scene environments, environmental components, architectural components, material textures, and similar items images, which, in one embodiment, generally include images needed to created a surrounding virtual environment and/or structural features defining a setting for a photorealistic scene 50. Physical assets category includes images of items to be placed in a scene setting including furniture, home décor, utensils, cookware, artwork, and/or any other items that can be placed in the basic setting to dress the setting. In one example, physical assets include images corresponding to items being offered for sale by a retailer.

Each of buttons 122, 124, and 126 as well as other buttons described herein can be presented as text, a geometrical shape, image, amorphous shape, and/or any combination thereof and user interaction, such as selection, of such buttons 122, 124, and 126 is configured to navigate further into or back out of a corresponding presentation of digital warehouse 60. In the case of buttons 122, 124, and 126, each navigates into a corresponding group of 3D images from 3D image database 14 for each respective category thereof, that is 3D assets category, physical assets category, sample assets category, etc., in one example. For instance, as illustrated, upon selection of 3D assets button 122, additional subcategory buttons are presented, such as models button 128, environment button 130, architecture button 132, and texture material button 134, along with an explore all button 136 to peruse the entire 3D asset category of images.

In one embodiment user interface screen 120 additionally presents other means for finding particular images for possible inclusion in a photorealistic scene, such as a search bar 140. In one example, search bar 140 includes a category field 142, such as a drop-down menu category field 142, and an entry field 144 for a user to enter a full or partial description of an item a user wishes to find and/or view for possible inclusion in a working board 92. Further, a "go" or other search activation button 146 is included to initiate a search as defined by category field 142 and/or entry field 144. Other buttons 148, etc., are also contemplated to facilitate user navigation throughout digital warehouse 60.

Figure 3:
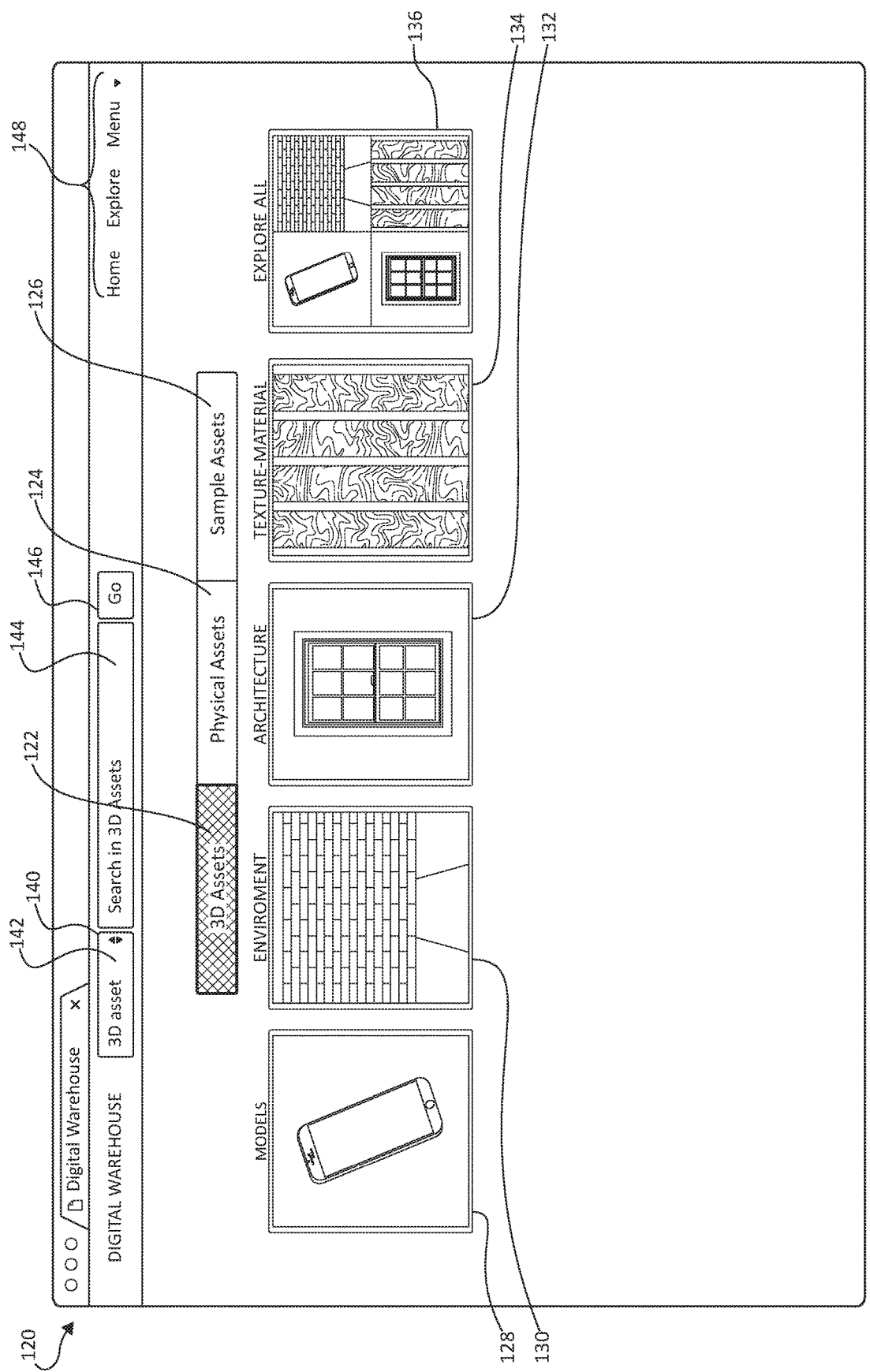
FIGS. 3-7 are schematic illustrations of user interfaces of a digital warehouse, according to one embodiment of the present invention.
Figure 4:
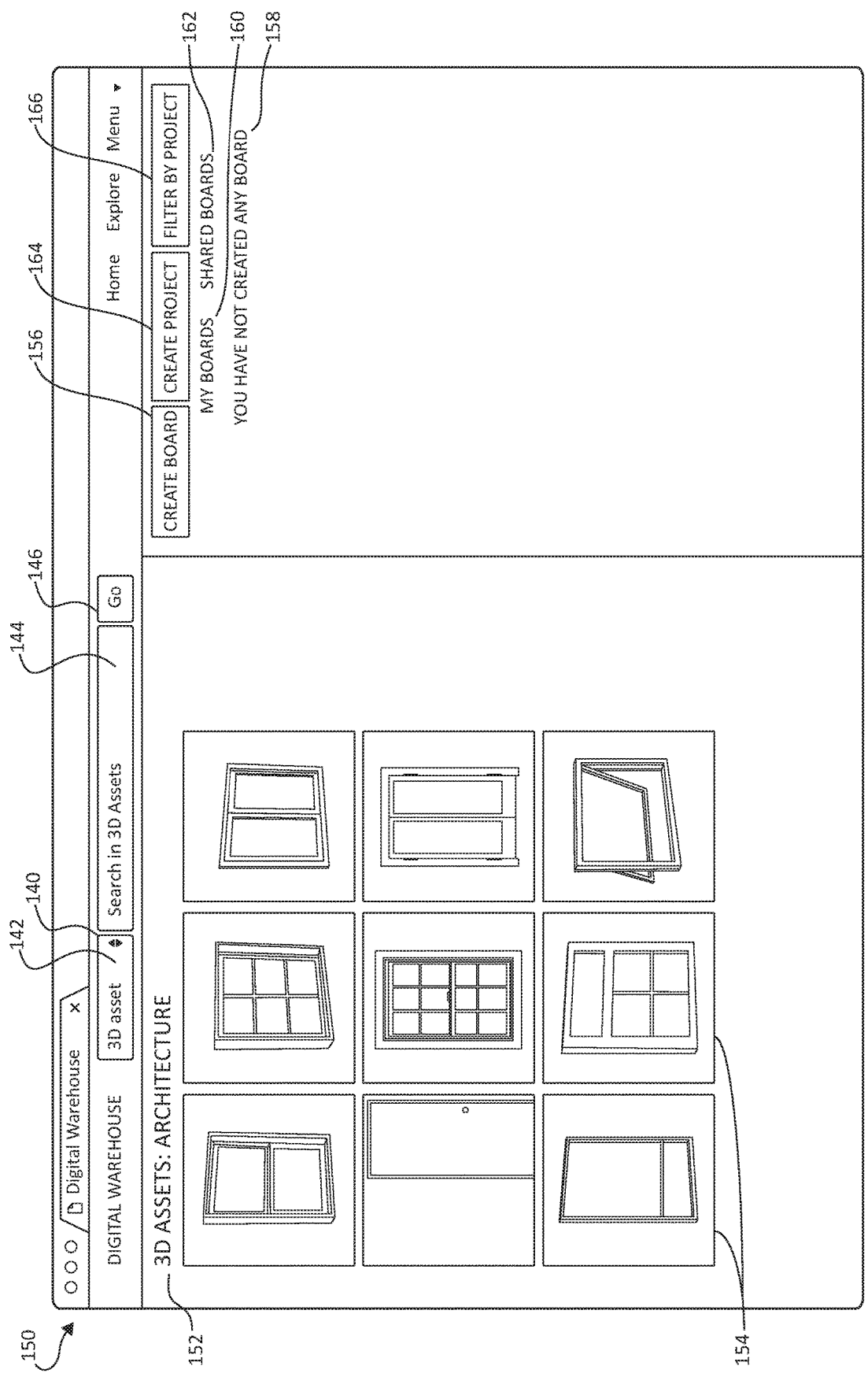

FIG. 4 illustrates user interface screen 150 that, in one embodiment, is presented upon user selection of architecture button 132 from user interface screen 120 of FIG. 3. In one example, user interface screen 150 provides item image representations 154 visually showing at least a portion of or two-dimensional view of each item within the corresponding selected categories and/or subcategories. Item image representations 154 allow a user to select the item images desired to create photorealistic scene 50 for a corresponding working board 92. In one example, user interface screens 150 and/or other interface screens shown and not shown of digital warehouse 60 also provide means for creating new working boards 92 and/or projects 90. As illustrated in FIG. 4, user interface screen 150 includes a create board button 156 and/or a create project button 158. As described above with regard to working scene collections database 20, each working board 92 corresponds with photorealistic scene 50 to be created with one or more working boards 92 being grouped into projects 90. Buttons 156 and 164 allow the user to create new working boards 92 and projections 90, respectively.

Figure 5:
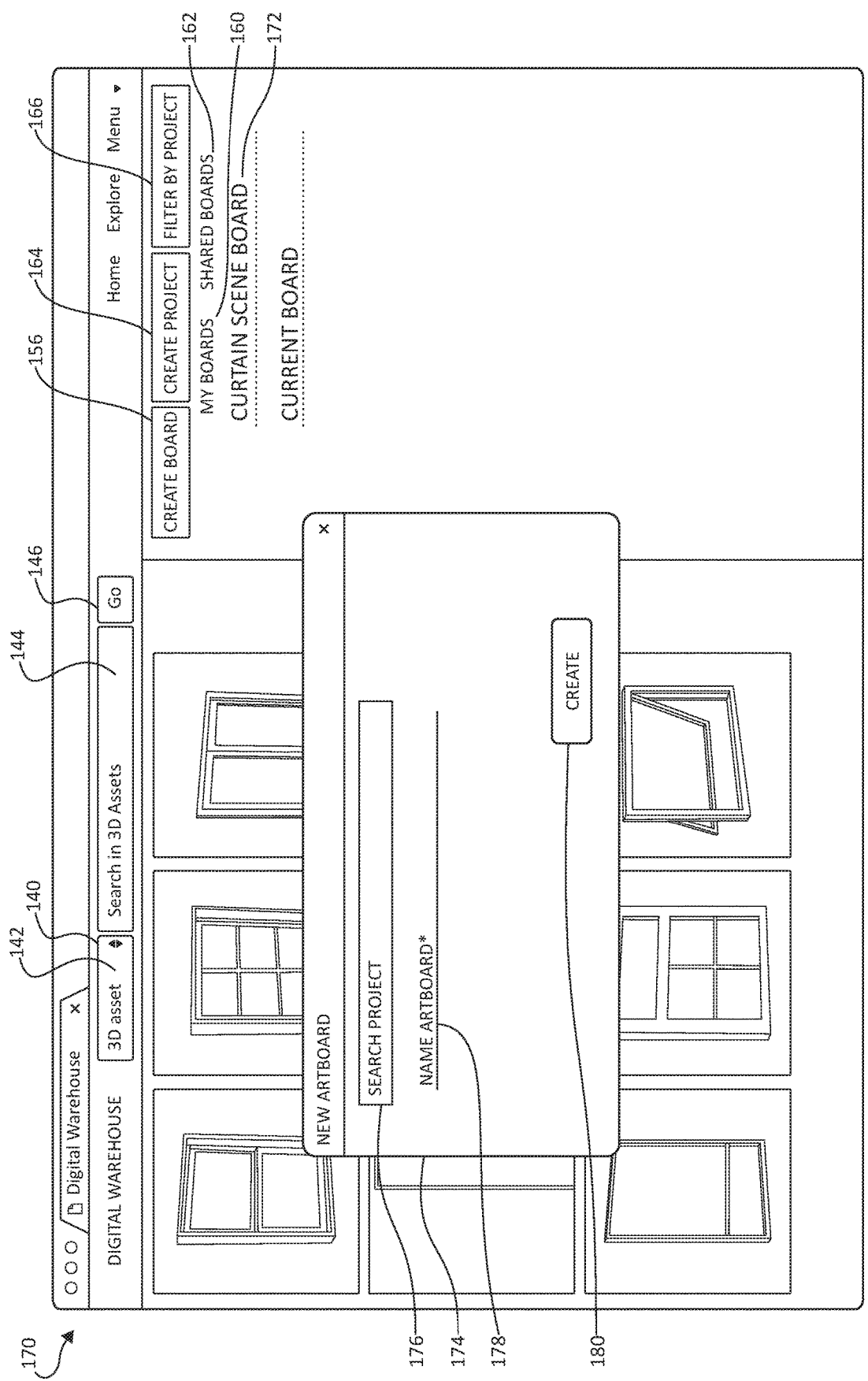

FIG. 5 illustrates user interface screen 170, for example, as would appear upon user selection of create board button 156 of FIG. 4. In this example, a pop-up window 174 facilitates creating a new working board 92 and allows the user to search for a corresponding project 90 via input field 176 and to enter a name for the working board 92 at input field 178. Once all information is believed to be correct, the user initiates board creation via a create button 180. In one example, once each working board 92 is created, working board names are indicated in a listing 172 corresponding with a currently selected project 90.

Existing working boards 92 previously created by the user or other users are accessed via a my boards button 160 and a shared boards button 162, respectively. My boards button 160 navigates to a screen interface (not shown), presenting user with a textural and/or image based representation of each previously created working board 92. Shared boards button 163 navigates to a screen interface (not shown) presenting the user with a textural and/or image based representation of working boards 92 previously created by other users that have shared the same with the current user and/or the public as a whole. If no working boards 92 have previously been created at all or for a particular related category, in one example, user interface screen 150 presents an indication 158 that no corresponding boards have been created. Once project 90 and working board 92 are created, the user is able to double click and/or otherwise suitably interact with each item image representations 154, which, in one embodiment, function as a button, to add the corresponding item or, more particularly, an image of the corresponding item to the selected one of working boards 92.

Figure 6:
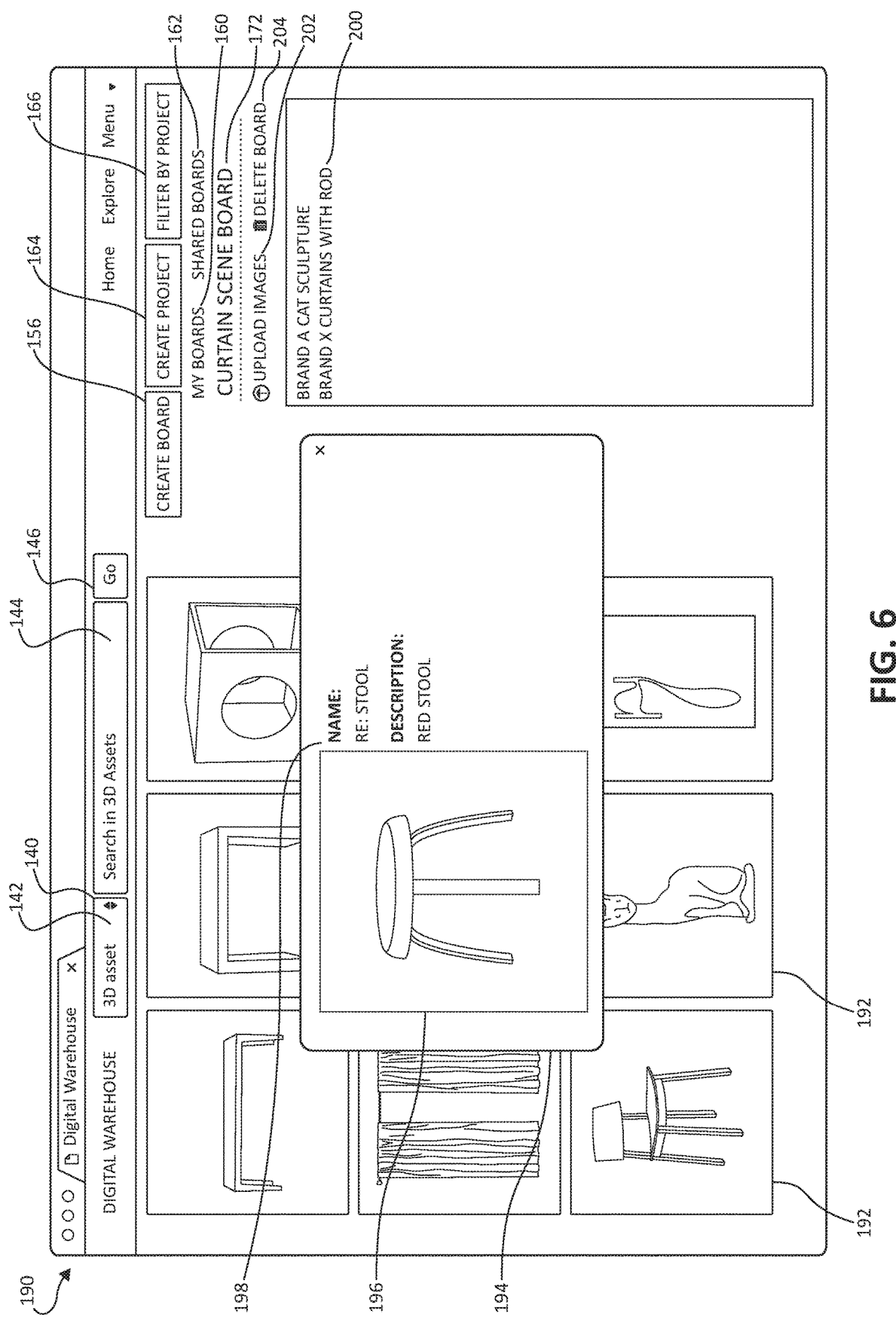

When working with a created working board 92, architectural item image representations 154 (see FIGS. 4 and 5) and product item image representations 192 as shown in user interface screen 190 in FIG. 6, are presented in accordance with prior user category input. While a double click of each item image representation 154 or 192 adds corresponding item image representation 154 or 192 to the currently selected working board 92, in one embodiment, a single click or even hover over one of item image representations 154 and 192 activates a pop-up window 194 over a remainder of user interface screen 190, providing additional details of the corresponding one of item image representations 154 and 192. In one example, the additional details of the corresponding one of items includes a larger image representation 196 and/or textural description 198, which, in one example, includes a name, description, origin, brand, and/or other helpful identifying information.

Item image representations 154 and/or item image representations 192 selected for inclusion in a selected working board 92 are, in turn, listed on user interface screen 190 in a listing 200, which may be shown in a textural list format and/or as thumbnails. In one embodiment, user interface screen 190 additionally allows a user to upload new images not included in previously uploaded image options via upload button 202 and/or to delete created boards via delete board button 204. Other buttons and/or related functional features are also contemplated as will be apparent to those of skill in the art reading the present application.

Figure 7:
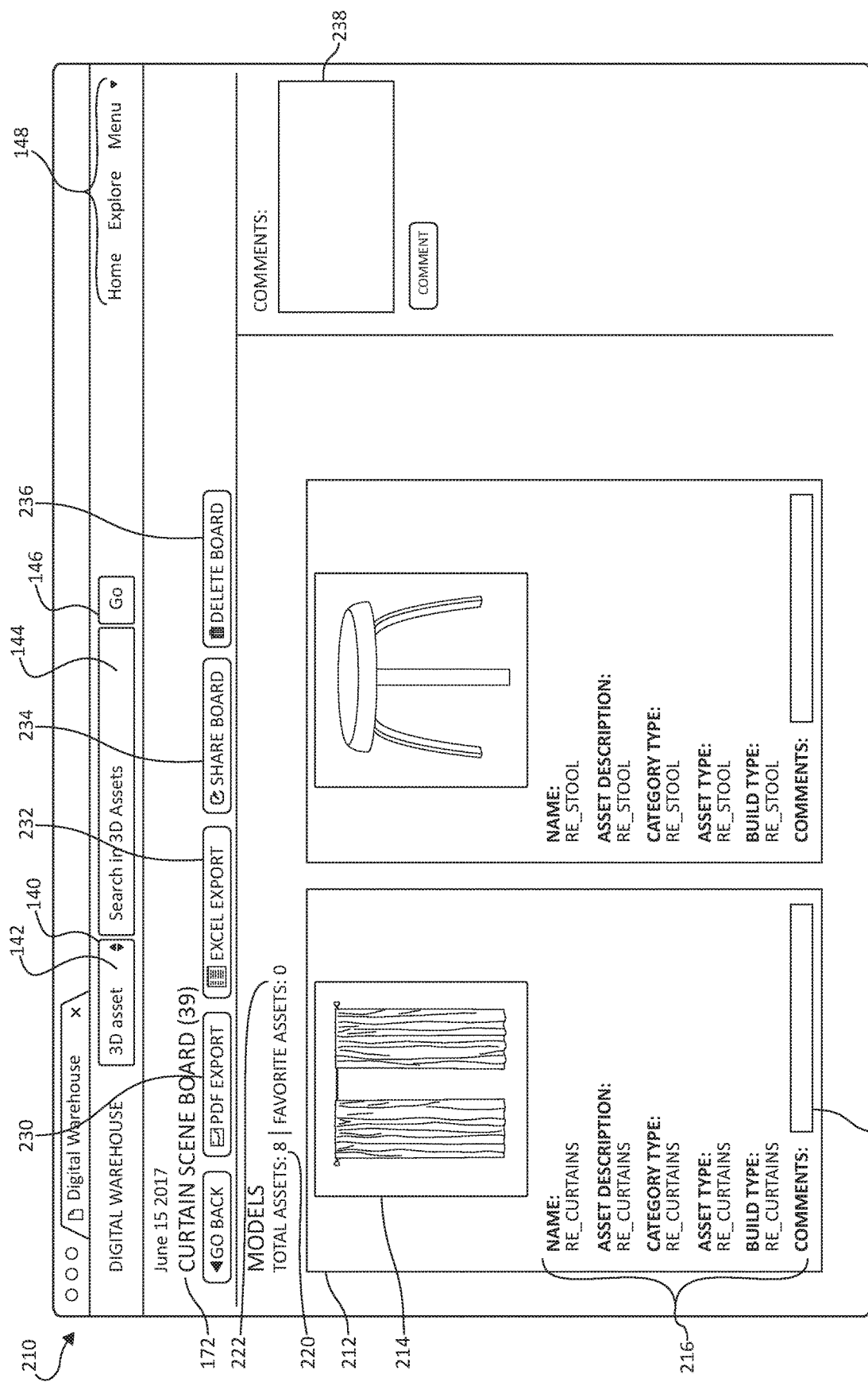
Figure 8:
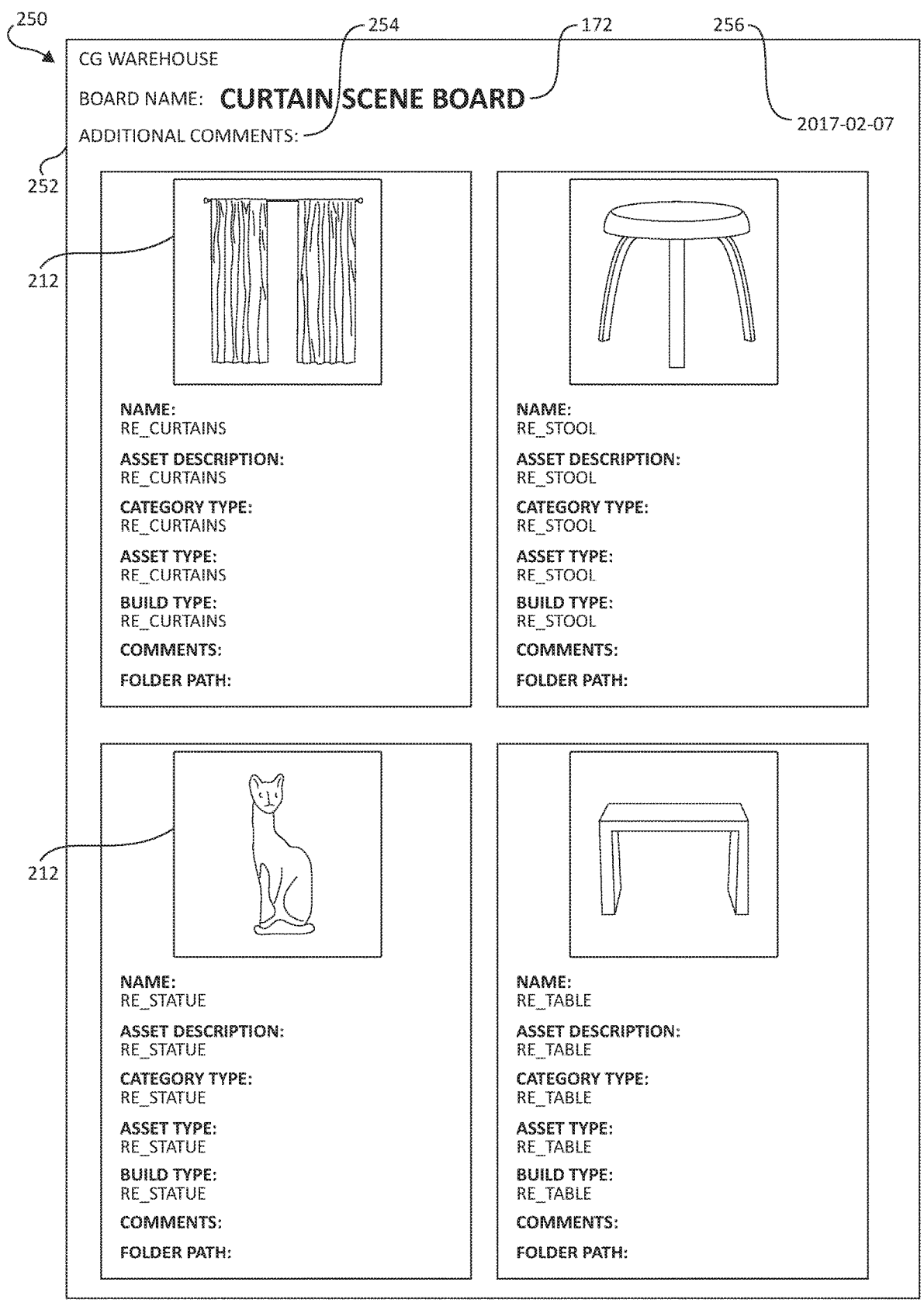
FIG. 8 is an illustration of output from the digital warehouse interface, according to one embodiment of the present invention.

Details of a selected one of working boards 92 are further viewable, for example, as illustrated in user interface screen 210 illustrated in FIG. 7 as accessible upon user interaction or other selection of a corresponding working board name from listing 172 (FIG. 6). User interface screen 210 includes a detailed representation 212 of each of the items selected for the corresponding working board 92 (FIG. 1). In one example, each detailed representation 212 includes one or more of a photo or other image 214 depicting the item and textural description 216 including name, asset type, category type, brand name, color, image descriptors, and comment field editable by the user. In one embodiment, user interface screen 210 further displays a number 220 of items selected for the particular board and/or number 220 of items designated as favorites of the selected items. Various buttons are included permitting sharing, editing, and/or deletion of the selected working board 92. In one example, user interface screen 210 includes a portable document format (PDF) export button 230, a spreadsheet export button 232, a share board button 234, and a delete board button 236. Each of PDF export button 230 and spreadsheet export button 232 output a corresponding format of board details including more detailed listings similar to listing 172 (FIG. 6). For example, FIG. 8 illustrates an output 250 such as a PDF document or a printed version thereof on paper 252. Output 250 includes detailed representations 212 of the selected items, a field 254 for comments on the exported working board 92, and/or a date 256 to facilitate keeping various exported versions of working board 92 organized.

A user can share a partially or fully completed working board 92 with other users, for example, using a share board button 234 on user interface screen 210 and/or delete a working board 92 using delete board button 236. In one example, user interface screen 210 additionally includes a comments field 238 to allow a user to make comments and/or take note of working board 92 as a whole. Other buttons and/or functions presented on user interface screen 210 in addition to or as an alternative to those described herein are also contemplated.

Using user interface screens 120, 150, 170, 190, 210, and/or other user interface screens as will be apparent upon reading the present application, one of skill in the art will appreciate how a user can select items, edit items, review items, and share the same to arrive at creation of final board 92 in operation 108 of FIG. 2, where the selected items will be available for use in creating a photorealistic scene. In one embodiment, a use interacts with user interface screens 120, 150, 170, 190, and 210 in a non-virtual reality environment.

After items are selected in operation 108, method of creating a photorealistic scene 100 continues to virtually creating a scene using 3D images corresponding to the selected items at 110. Referring to the example virtual design system 18 in FIG. 10, in one example, operation 110 is completed in a generally open area 300, typically indoors, containing at least a portion of a virtual design system 18. As described above, virtual design system 18 uses computer technology that simulates a user's physical presence in a virtual or imaginary environment and allows for the performance of the method, etc. as generally described herein and equivalents thereof. In one embodiment, virtual design system 18 includes controllers 80, such as controller handsets, a virtual reality headset 82, and a wireless processor 84 in communication with each of controllers 80 and headset 82 allowing user to move within and interact with a 3D virtual environment.

As virtual design system 18 uses a large degree of processing, processor 84 assists in such processing. In one example, processor 84 includes a display screen 394 and input mechanism(s) 396 such as a keyboard, mouse, touch screen, stylist, controller, etc. and allows user 392 and/or a secondary user (not shown) to interact with virtual design system 18 to facilitate user 392 interaction with virtual design system 18, such as to supplement content presented to user 392, to change items presented to user 392, to alter working board 92 or project 90 details presented to user, to interact with digital warehouse 60, etc.

As generally described above, a portion of virtual design system 18, more particularly, virtual reality headset 82 is placed over at least one, and, in one embodiment, two eyes of user 392. Virtual reality headset 82 presents visual representations to user 392 and allows a user to "look around" a 3D virtual environment 398 (see FIGS. 11 and 14-16) to the left, right, up, down, etc. to see different portions of 3D virtual environment 398 in a manner simulating a physical presence of user 392 in a similar, actual, physical environment. In this manner, virtual reality headset 82 displays 3D virtual environment 398 from an interactive vantage point of the user based on movement of the user as detected by positioning changes of the virtual reality headset. In one example, virtual realty headset 82 provides means for viewing 3D virtual environment 398 by providing visuals to user 392 corresponding with movements of the users head up, down, right, left, etc. to simulate reality in 3D virtual environment 398.

When user 392 interacts with virtual design system 18, user 392 generally sees only what is presented to him/her via virtual reality headset 82, such that it can be easy for user 392 to lose his/her physical location bearings in open area 300. To assist user 392 in limiting his/her movement to a particular floor space 400 within open area 300, a barrier 302 is placed surrounding at least a portion of floor space 400, in one example. Barrier 302 is configured to give user 392 physical, visible, and/or audible feedback regarding the physical location of user 392 at or near a boundary of available or designated floor space 400. In one example, barrier 302 is placed on floor surrounding floor space 40 and is in the form of bubble wrap or similar item. If user 392 steps onto barrier 402, in such an embodiment, user 392 will feel bubble wrap barrier 402 below his/her feet and/or her bubbles popping indicating to him/her that they should limit further movement beyond barrier 402.

Barriers 402 in the form of strings, lasers, etc. and/or other means for notifying user 392 that they are outside or nearing an outside of floor space 400 are also contemplated. In one embodiment, in addition or as an alternative to barrier 402, virtual reality controllers 80 may vibrate and/or provide other feedback to user 392 if and when user 392 approaches or reaches boundaries of floor space 400. Defining floor space 200 to user 392 is important as physical walls or other obstacles (not shown), such as equipment or styling products, may be placed outside of floor space 400. Barrier 402 generally prevents or at lease dissuades user 392 from colliding with obstacles outside of floor space 400, changes in floor typography, or other items that could potentially injure user 392 and/or damage the obstacle.

Figure 13:
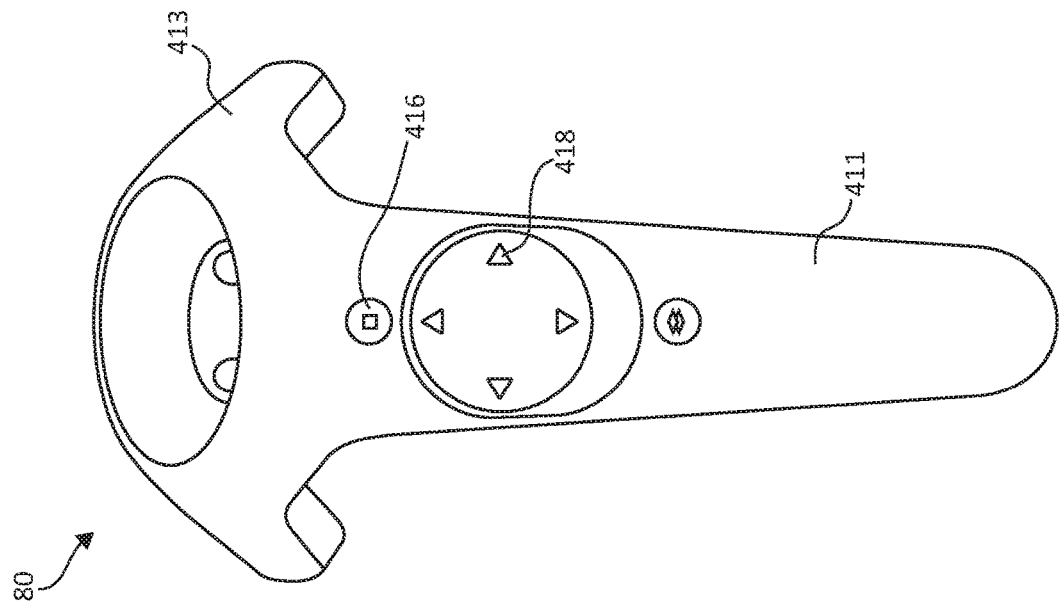
FIG. 13 is a front view illustration of a controller of the virtual styling system, according to one embodiment of the present invention.
Figure 12:
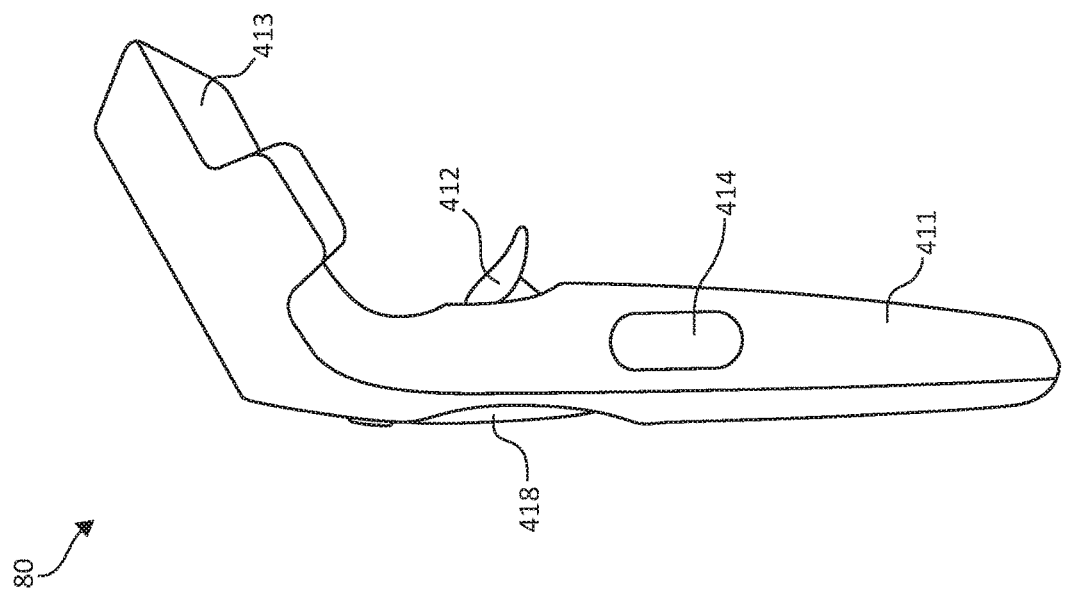
FIG. 12 is a right-side view illustration of a controller of the virtual design system, according to one embodiment of the present invention.

Virtual reality controller 80 allows user 392 to interact with 3D virtual environment 398 they are seeing in virtual reality headsets 92. For example, virtual reality controllers 80 are in the form of hand controls a user interacts with to select, move, place, turn, etc. items in 3D virtual environment 398 and/or items presented in a superimposed manner within 3D virtual environment 398, as will be further indicated below. FIGS. 12 and 13 indicate one embodiment of a virtual reality controller 80 in the form of a hand control, where in one example, user 392 uses one or more controller 80, for example, one virtual reality controller 80 in each hand to interact with 3D virtual environment 398 or items superimposed therein. While one example of virtual reality controller 80 is illustrated herein, any variety of virtual reality controllers 80 are contemplated as will be apparent to those of skill in the art upon reading the current application.

Illustrated virtual reality controller 80 includes an elongated hand portion 411 and a top sensor portion 413, which provides virtual design system 18 with the position and movement of virtual reality controller 80 within open space 300, coupled thereto. Virtual reality controller 80 includes control buttons or switches located on or near hand portion 411 to allow user 392 to interact with virtual reality controller 80 while holding hand portion 411 in their grasp. For example, virtual reality controller 80 includes one or more of control trigger 412, control button 414, controller sensor 416, and/or touch controller 418 for communicating and interacting with virtual design system 18, more particularly, with 3D virtual environment 398 as presented to user 392.

In one example, where two controllers 80 are used, one in each hand of user 392, trigger 412, control button 414, controller sensor 416, and/or touch controller 418 may control different aspects of virtual design system 18 on one controller 80 as compared to the other. For example, each of trigger 412, control button 414, control sensor 416, and/or touch controller 418 may be used to control one or more of what board 92 is viewed or active, to control navigation around a board 92, to grab an image or item, to turn or rotate an image or item, to move an image or item, to turn gravity in 3D virtual environment 398 on and off, to toggle between various modes or scene selections, etc.

Figure 9:
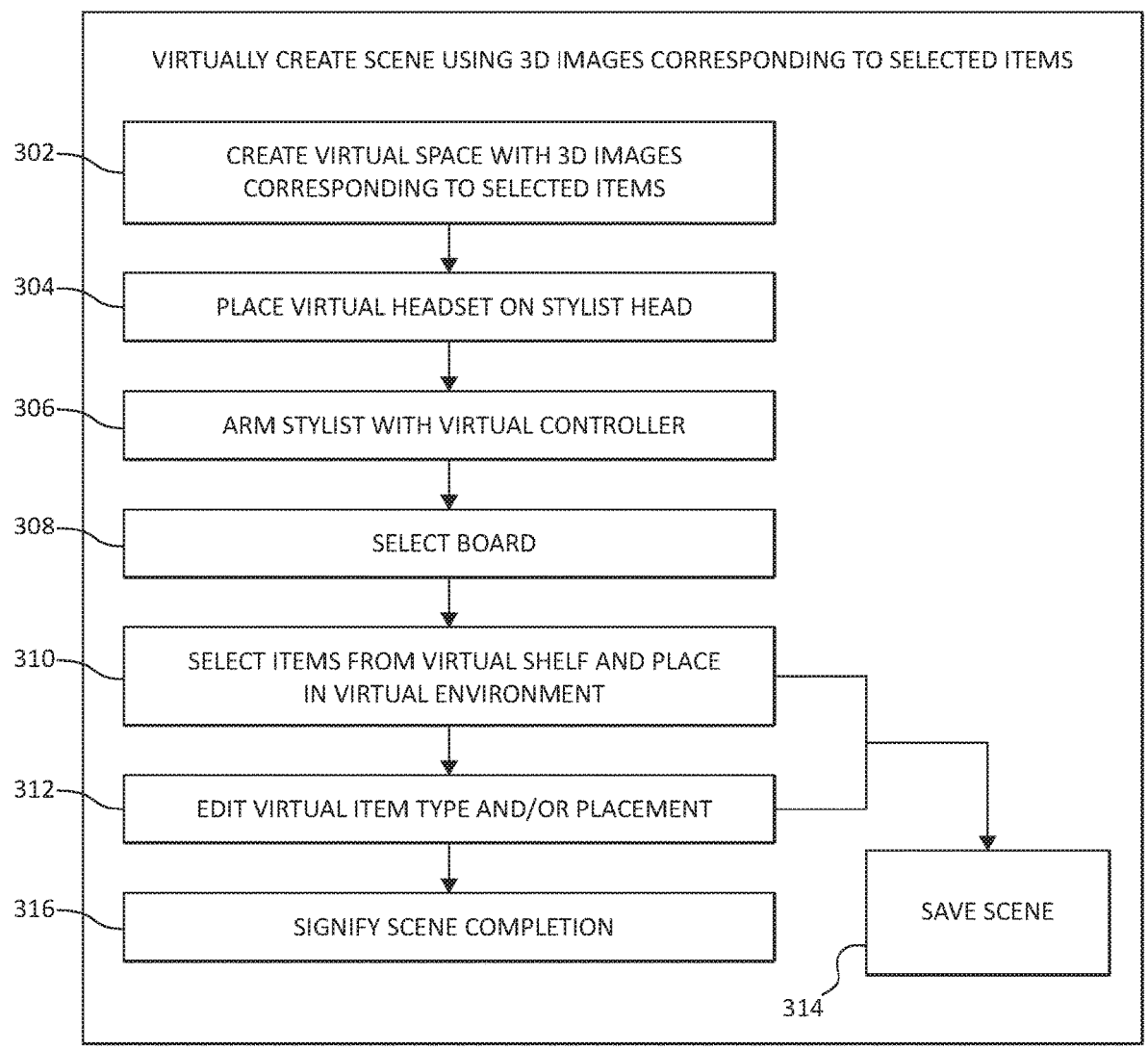
FIG. 9 is a flow chart illustration of a method of virtually creating a photorealistic scene, according to one embodiment of the present invention.
Figure 10:
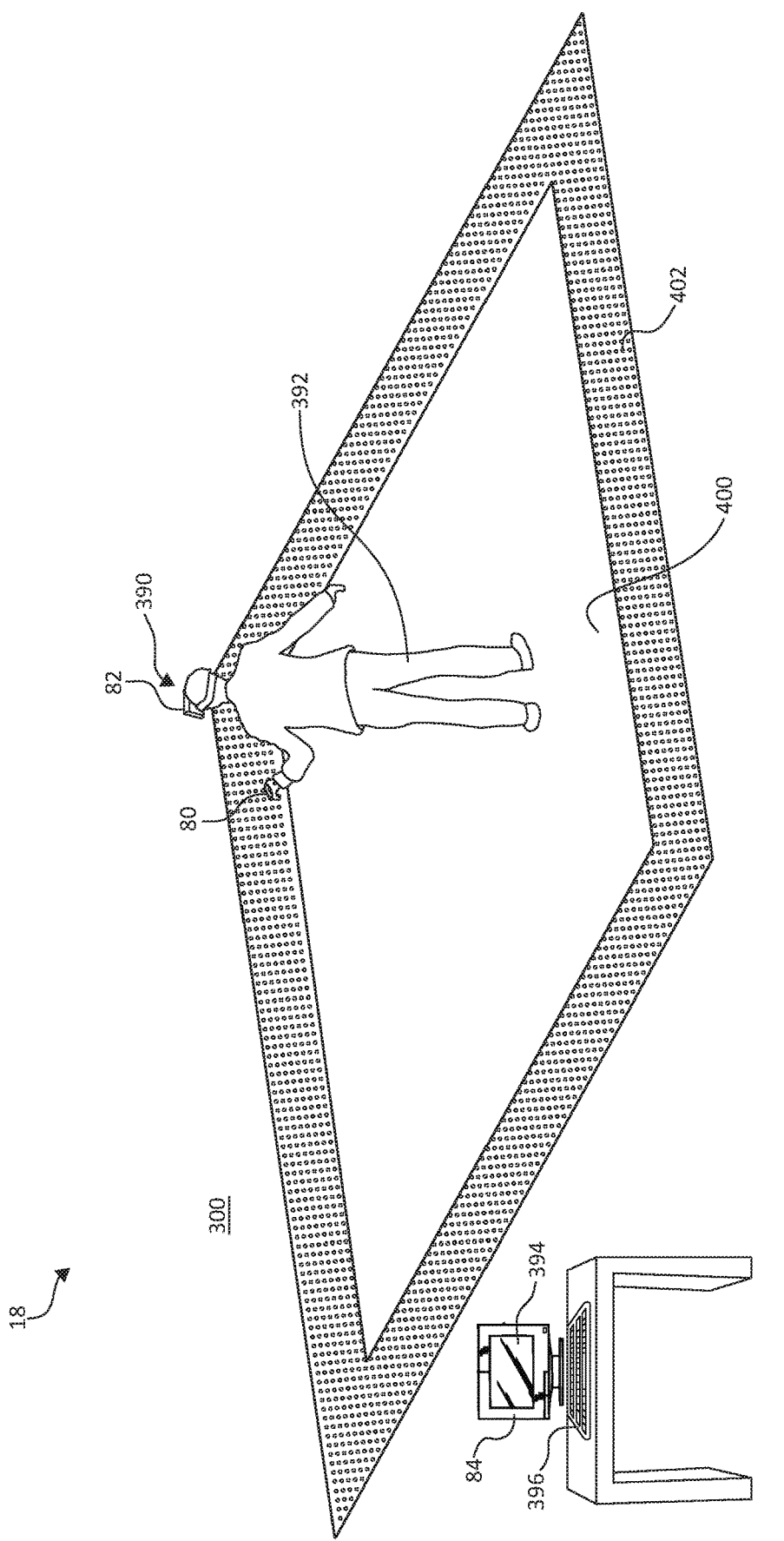
FIG. 10 is an illustration of a virtual design system and corresponding physical environment, according to one embodiment of the present invention.
Figure 11:
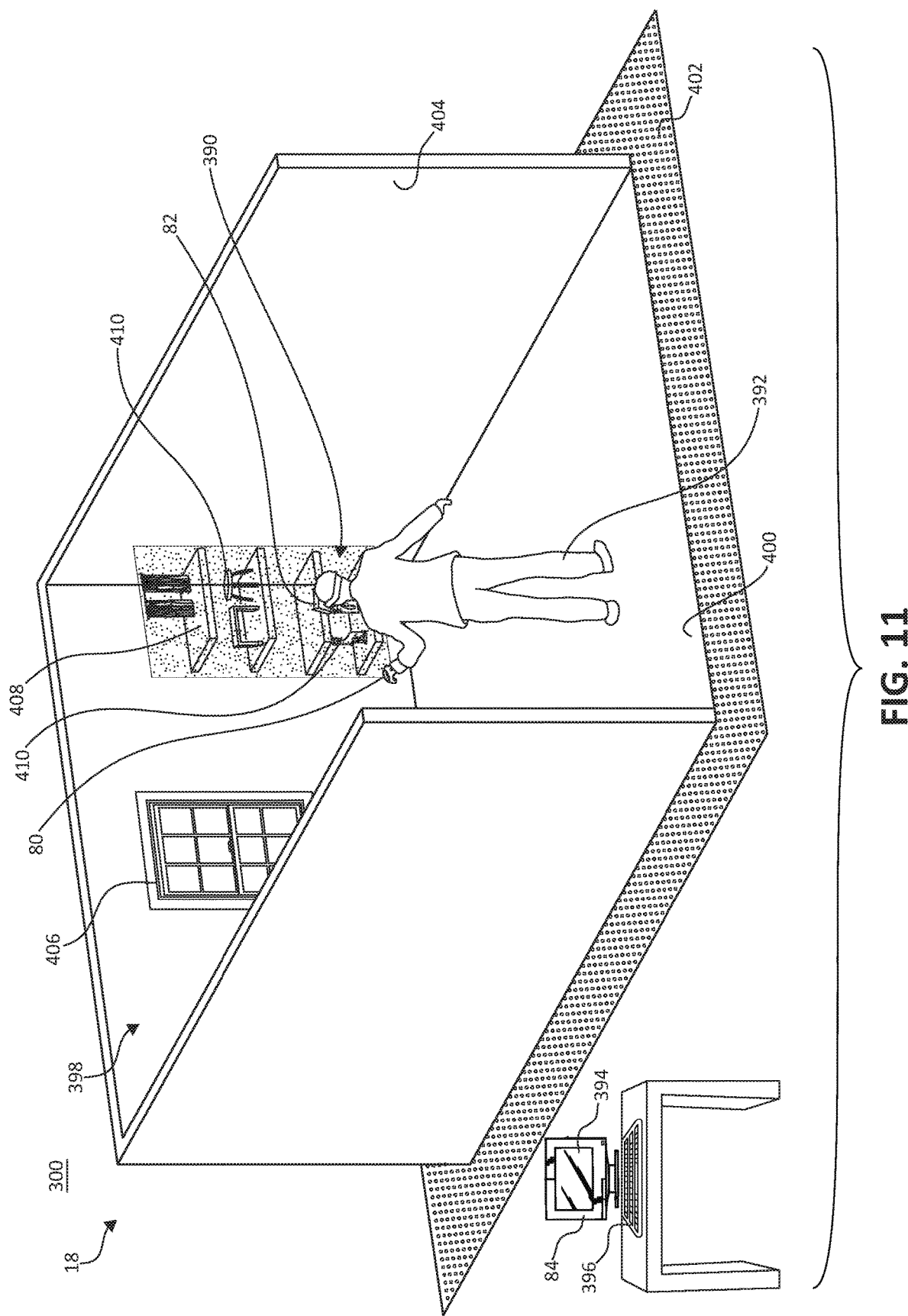
FIG. 11 is an illustration of a virtual design system and corresponding physical environment with the 3D virtual environment superimposed thereon, according to one embodiment of the present invention.

One example, of operation 110 is more fully illustrated in the flow chart of FIG. 9 indicating one or more operations that are performed using a virtual design system 18 as illustrated in FIG. 10. At 302, a virtual space or stage is created using 3D images corresponding to selected environmental and/or architectural items and may be directed via processor 84. For example, FIG. 11 shows virtual design system 18 with virtual items superimposed thereon for illustrative purposes. For example, floor space 400, walls 404, and window 406 are placed in 3D virtual environment 398 and a preconceived or predetermined manner to form a room or background for the scene to be created based on input by stylist or another user 392. While shown in FIG. 11, it should be understood that the floor covering on floor space 400, walls 404, and window 406 are part of 3D virtual environment 398, and therefore, are only visible to user 392 or others wearing virtual reality headset 82. In one example, however, processor 84, or more particularly, display 394 coupled with processor 84 is configured to show the portion of the 3D virtual environment 398 currently being viewed by user 392 via virtual reality headset 82. While described here as happening before user 392 interacts with virtual design system 18, in another example, user 392 virtually builds the space by moving environmental or architectural components, as previously selected from digital warehouse 60 when interacting with virtual design system 18, as will be apparent to those of skill in the art upon reading this application.

At 304, user 392 places virtual reality headset 82 on his/her head such that the eyes of user 392 are fully covered and display screen (not shown) of virtual reality headset 82 is placed around the visual perception area of the eyes of user 392. At 306, user 392 is armed with one or more controllers 80 and proceeds to floor space 400, if not already so located on floor space 400. In one example, operation 306 occurs before, after, and/or substantially simultaneously with operation 304. In this manner, user 392 is ready to interact with virtual design system 18 and virtual reality headset 82 is activated such that user 392 only sees 3D virtual environment 398, rather than the actual physical environment surrounding him/her.

Figure 14:
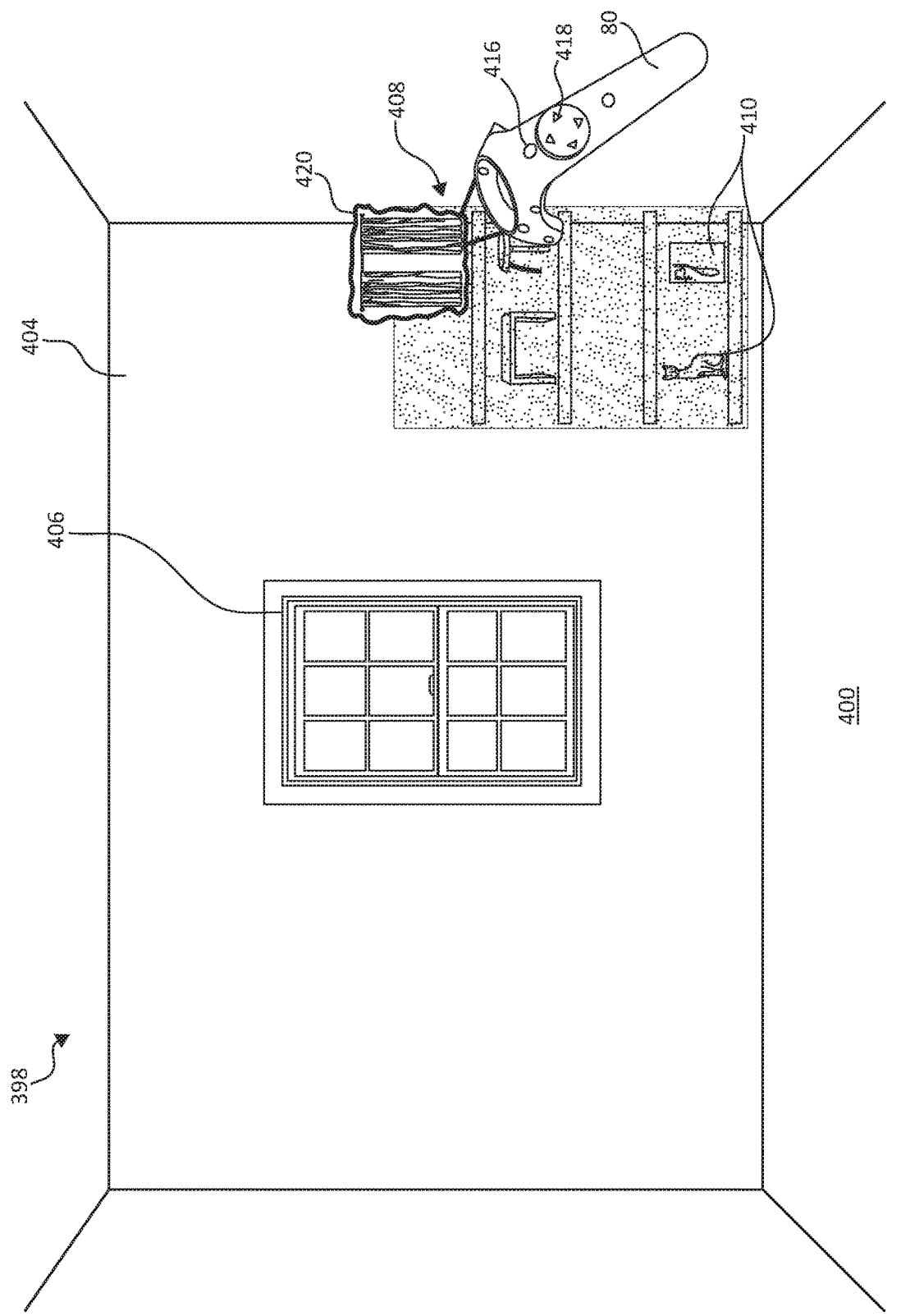
FIGS. 14-16 are illustrations of a 3D virtual environment, according to one embodiment of the present invention.

At 308, user 392 begins to interact with virtual design system 18 by selecting a project 90 and/or board 92, that is, if virtual design system 18 is not previously configured via processor 84 to show the appropriate project 90 or board 92 for user 392. As illustrated in FIG. 11, in one embodiment, a source shelf 408 or other source zone, which is not otherwise part of 3D virtual environment 398, is superimposed over 3D virtual environment 398 and presents user 392 with control options and/or item images, such a visual representations thereof, for selection and placement within 3D virtual environment 398. FIG. 14 shows 3D virtual environment 398 with source shelf 408 from the perspective of user 392 wearing virtual reality headset 82. In one example, source shelf 408 is visually presented in the form of storage shelves or something similar with visual representations 410 of items previously selected to be part of the current working board 92, being shown on the shelves.

Each visual representation 410 corresponds with items selected from digital warehouse 60 at 108 (FIG. 2) and may be a a chunk version of the corresponding item, that is, is selected from chunk image database 54 (FIG. 1) or a two-dimensional, thumbnail representation. Each visual representation 410 is selectable and movable by user 392 using virtual reality controllers 80 into 3D virtual environment 398, at which time, visual representation 410 is converted into chunk 3D item image 420 properly scaled to 3D virtual environment 398. In another embodiment, each visual representation 410 is a photorealistic image corresponding to the item selected from photorealistic image database 52.

Figure 15:
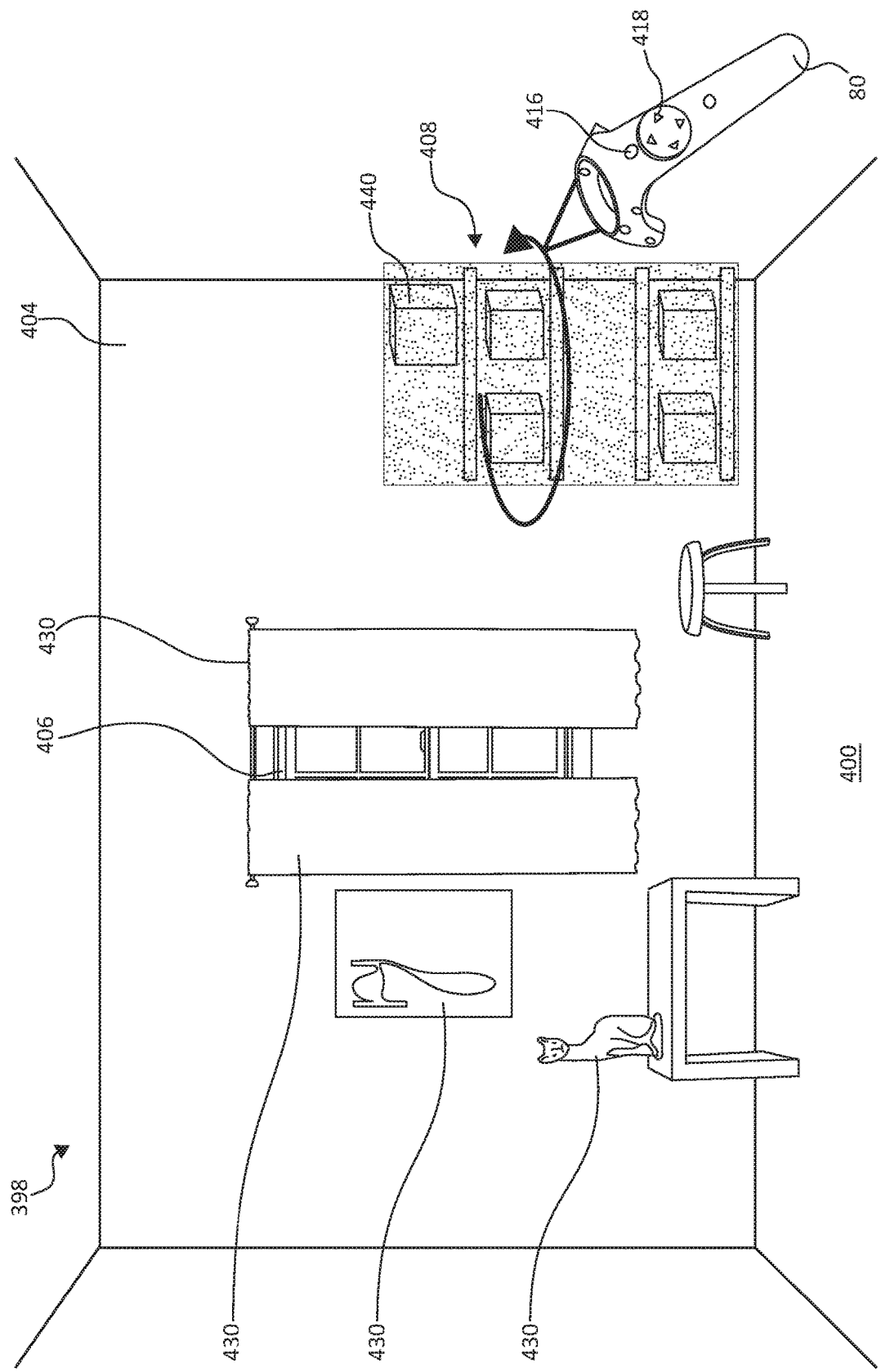
Figure 16:
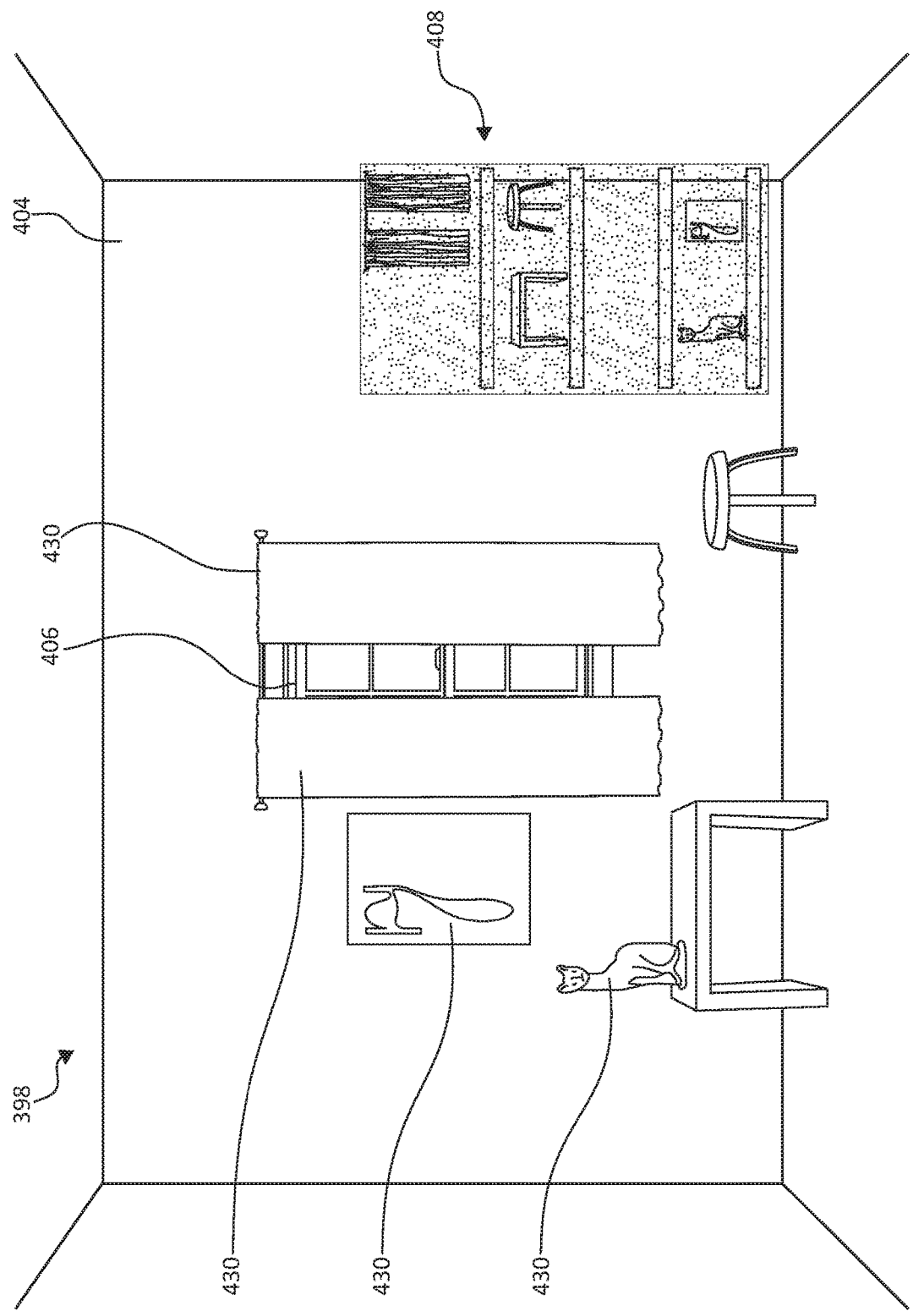

In one example, interacting with one of the controllers 80, user 392 is able to virtually spin source shelf 408, as indicated in FIG. 15, to show option boxes 440 or other suitable representations of different projects 90 or working boards 92, which can be selected to navigate through different, previously created projects 90 and/or boards 92 and images associated with each as desired. Source shelf 408 can be spun using controller 80 back to its position shown in FIGS. 11 and 14 with visual representations 410 thereon. Other representations or presentations of available visual representations 410 are also contemplated.

At 310, user 392 uses controllers 80 to select one or more visual representations 410 from source shelf 408 and to move the same into position within 3D virtual environment 398. For example, one of controllers 80 is pointed toward source shelf 407 and a desired one of visual representations 410 and selects the same, for example, by pulling a control trigger 412 to select visual representation 410, thereby, in one example, replacing visual representation 410 with a properly scaled corresponding 3D item image 420. Controller 80 is then moveable and controllable to drag selected 3D item image 420, in real time, into 3D virtual environment 398. In one example, while visual representations 410 are all sized to fit on source shelf 408 for presentation to user 392, upon selection thereof and dragging of selected 3D item image 420 off of source shelf 408 and into 3D virtual environment 398, selected 3D item image 420 automatically is resized to its original scale based on the scale of the surrounding environment. In this embodiment, user 392 is not tasked with being sure the scale of each placed image in 3D virtual environment 398 has the correct scale to correspond with other items in 3D virtual environment 398. For example, as shown in FIG. 14, selected 3D item image 420 is of a curtain and is sized to fit on source shelf 408, while in FIG. 16, 3D item image 430 of curtain is placed within 3D virtual environment 398 and is scaled appropriately to fit window 406. In one embodiment, placed 3D item images 430 are each a chunk image from chunk image database 54.

Once a 3D item image 430 is placed in 3D virtual environment 398, at 312, the positioning, that is, placement, rotation, tilt, etc. of 3D item image 430 is adjusted in real time, if desired at 312, by user 392 via virtual reality controller(s) 80. In one example, at 312, other portions of 3D item image 430 can also be adjusted using virtual reality controller(s) 80, for example, if the item corresponding to 3D item image 430 comes in other colors, textures, or finishes, the corresponding color, texture, and/or finish of the 3D item image 430 is adjusted. In other embodiments, a placed 3D item image 430 can be replaced with a different 3D item image 430 corresponding to a different item entirely, in real time. Operations 310 and 312 are repeated as desired until 3D virtual environment 398 is styled as desired for end or near end photorealistic scene. At any time during method 110, for example after selection, placement, and/or editing of 3D item images in 3D virtual environment 398, the currently styled 3D virtual environment 398 can be saved at 314 to working scene collection database 20, as will be apparent to those of skill in the art.

Figure 18:
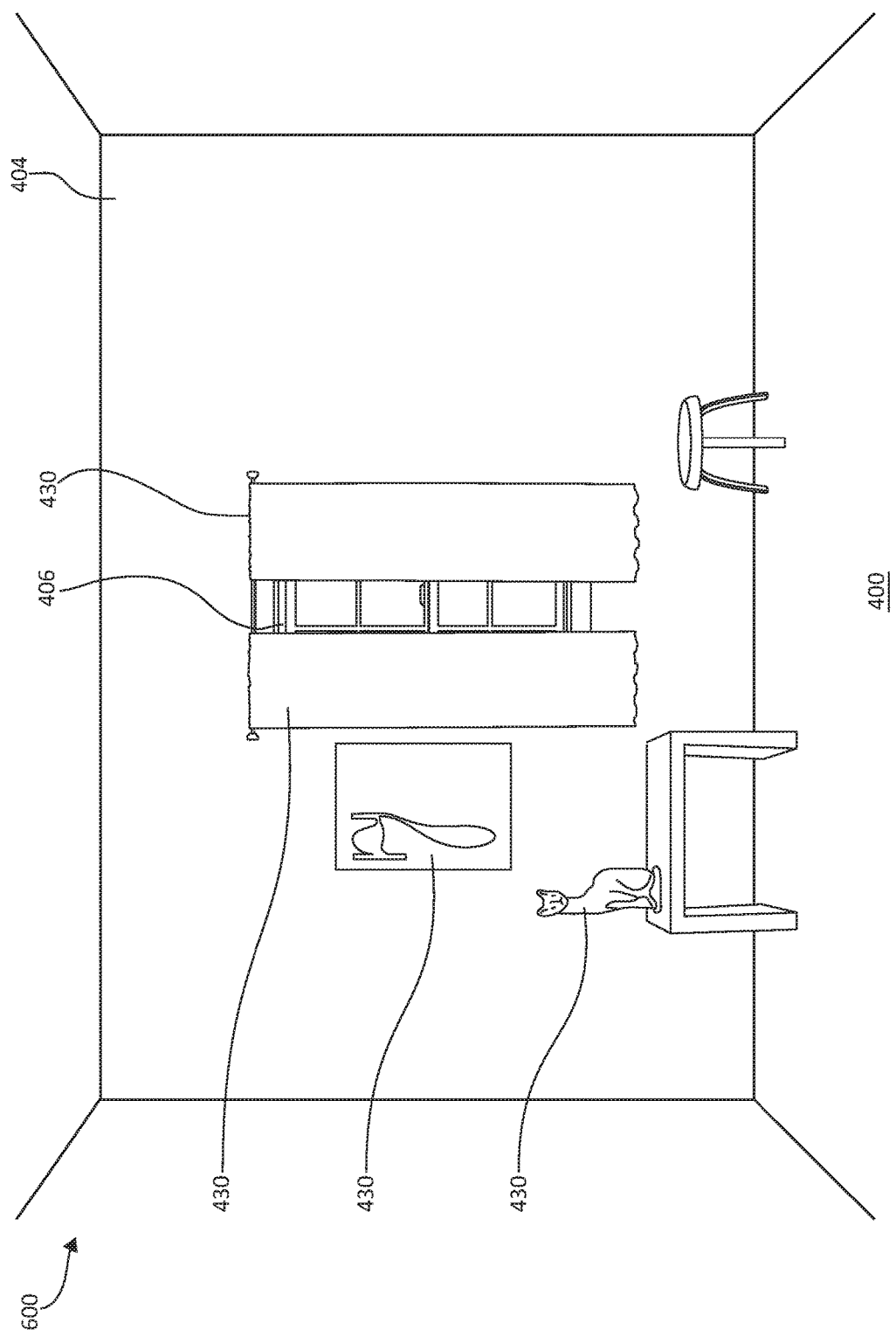
FIG. 18 is an illustration of a chunk scene, according to one embodiment of the present invention.

Once 3D virtual environment 398 has had all the desired 3D item images 430 added to and arranged as desired by user 392, at 316, user 392 signifies that styling of the chunk scene, see an example chunk scene 600 in FIG. 18, is completed via appropriate interaction with controller 80 and/or via processor 84. It should be noted that user 392 is not required to use all visual representations 410 for a project. The visual representations 410 from a selected board 92 are presented as available items so user 392 can relatively quickly build out a scene using some or all of visual representations 410, as desired, without searching for all such visual representations 410 from digital warehouse 60 while in 3D virtual environment 398. Once chunk scene 600 is completed, chunk scene 600 is saved, if not already completed at 314, and chunk scene 600 is ready to be converted to a photorealistic scene at 112 (FIG. 2). Although operation 100 is primarily described herein as being completed by a user interacting with 3D virtual environment 298 using virtual reality controller 80 and/or virtual reality headset 82, in one embodiment, a user alternatively and/or additionally interacts with 3D virtual environment 398 to complete operation 110 using another suitable processing unit such as a desktop computer, a laptop computer, an electronic tablet, a mobile phone, etc., as will be apparent to those of skill in the art upon reading the present application.

At 112, user 392 no longer in 3D virtual environment 398 or another user, such as computer programmer or software specialist, converts chunk scene 600 to a photorealistic scene 600A using dedicated software and processor 14 and access to image database 14. In one example, processor 14 is configured to automatically replace the chunk image versions of each of individual 3D item images 430 and/or architectural features 400, 404, and 406 with corresponding photorealistic 3D item images 430A and/or architectural features 400A, 404A, and 406A, while in other embodiments, processor 14 replaces images with the aid of a human user.

Figure 17:
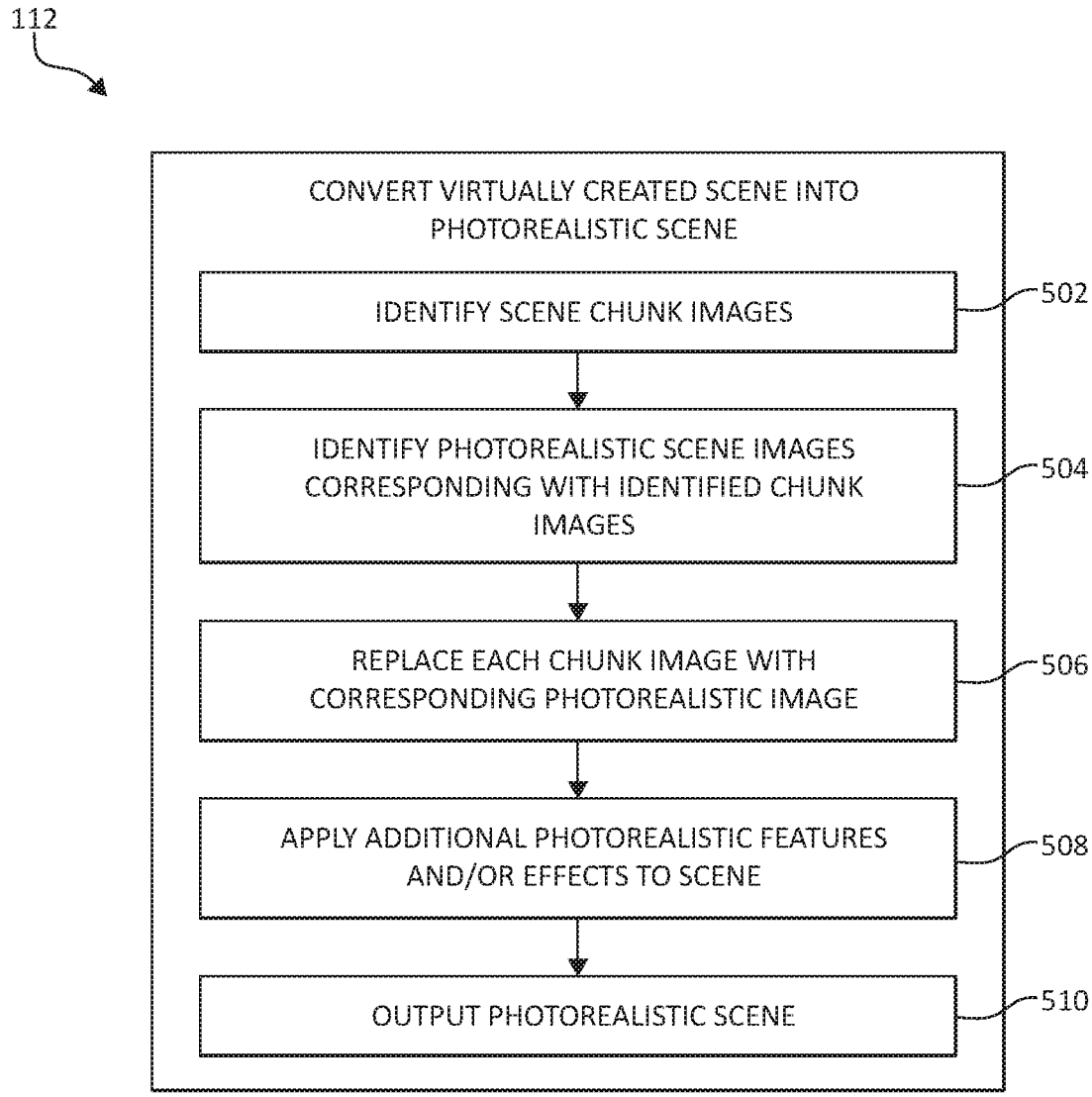
FIG. 17 is a flow chart illustration of converting a virtually created scene into a photorealistic scene, according to one embodiment of the present invention.

More specifically, one example of converting virtual created chunk scene into a photorealistic scene at 112 is illustrated in FIG. 17, and starts with identifying individual chunk images 430 within chunk scene 600 as corresponding to particular chunk images stored to chunk image database 54, at 502. At 504, a photorealistic image 430A is located in photorealistic image database 52 that corresponds with each identified chunk image 430. At 506, chunk images 430 in chunk scene 600 are each replaced with the one photorealistic image 430A determined to correspond with each chunk images 430. A similar replacement method is used to change chunk architectural features 400, 404, and 406 to photorealistic architectural features 400A, 404A, and 406A, in one embodiment. In one example, processor 16 automatically performs operations 504 and 506 with little or no user interference.

Figure 19:
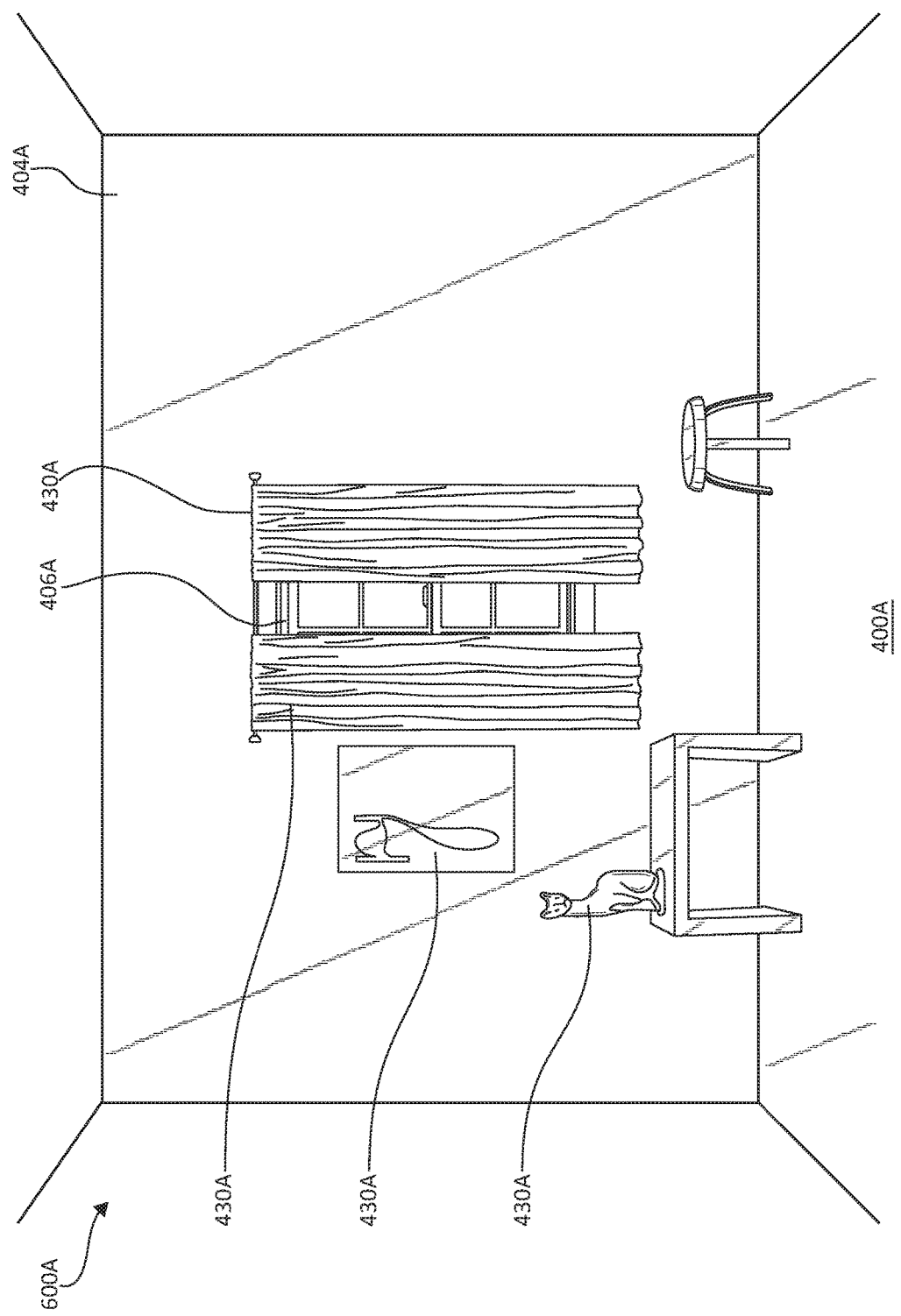
FIG. 19 is an illustration of a photorealistic scene, according to one embodiment of the present invention.

At 508, additional photorealistic features and/or effects are applied to the updated scene to further enhance the realism of the resulting photorealistic scene 600A of FIG. 19. For example, processor 14 using dedicated software alone and/or assisted by a user, reviews the interaction or overlaps between photorealistic images 430A, architectural features 400A, 404A, and 406A, lighting conditions, shadows, etc. and edits the image such that none of these features take away from the realism of the resulting photorealistic scene. For example, shadows from one photorealistic image 430A may be added to another photorealistic image 403A or architectural features 404A, 404A, or 406A, a light source or other luminosity may be added to or indicated via lighting conditions of the scene, and/or other changes may e made resulting in a final photorealistic scene 600A as generally indicated for illustrative purposes (that is, not to show true photorealism) in FIG. 19. Photorealistic scene 600A is output at 510 for use in an associated advertisement, sign, or other print or digital use.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and, in one example, is a non-transitory computer readable storage medium or database. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, infrared, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made through an external computer (for example, through the Internet using an Internet Service Provider).

The flowchart and block diagram in the above figures illustrate the architecture, functionality, and operation of possible implementations of systems, methods and computer program products according to various embodiments of the present invention. In this regard, each block in the flowcharts and block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A photorealistic scene generation system comprising:
 a virtual reality (VR) headset configured to visually present a user with a three-dimensional (3D) virtual environment;
 a VR controller separate from the VR headset and configured to receive input from the user during user interaction with the 3D virtual environment as viewed through the VR headset; and
 a VR processor in communication with the VR headset and the VR controller, the VR processor being programmed to:
  instruct the VR headset to display the 3D virtual environment having an interactive vantage point based on movement of the user based on positional data received from the VR headset,
  instruct the VR headset to display a source zone superimposed over the 3D virtual environment to the user, wherein the source zone provides visual representations of physical items previously selected for use in styling the 3D virtual environment,
  receive input from the VR controller to select and direct movement of one of the visual representations from the source zone and to move the selected one of the visual representations into the 3D virtual environment,
  convert the selected one of the visual representations into a 3D model of an item corresponding to the selected one of the visual representations as the visual representation is moved from the source zone into the 3D virtual environment, and
  in real time, adjust the orientation and placement of the 3D model within the 3D virtual environment to have an orientation and positional placement as directed by input from the VR controller;

a non-transitory computer readable storage medium for storing a photorealistic 3D model and a chunk 3D model for each one of a plurality of physical items, wherein the chunk 3D model is a less detailed representation of a corresponding one of the plurality of physical items than the photorealistic 3D model corresponding to a same one of the plurality of physical items, and the 3D model is the chunk 3D model, wherein the VR processor is further programmed to output a chunk scene from the 3D virtual environment including the chunk 3D model and additional chunk 3D models; and a conversion processor, in communication with the non-transitory computer readable storage medium, programmed to convert the chunk scene into a more nearly photorealistic scene by replacing individual ones of the chunk 3D model and the additional chunk 3D models with ones of the plurality of photorealistic 3D models from the non-transitory computer readable storage medium that corresponds to the same physical item as the chunk 3D model and the additional chunk 3D models, wherein the conversion processor is programmed to automatically convert the chunk scene into the more nearly photorealistic scene by replacing individual ones of the chunk 3D model and the additional chunk 3D models with ones of the plurality of photorealistic 3D models corresponding to the same physical item as the chunk 3D model and the additional chunk 3D models upon receipt of user input received via the VR controller indicating the chunk scene is complete.

2. The photorealistic scene generation system of claim 1, wherein the processor is configured to repeat receiving input from the VR controller, converting the selected one of the visual representations into the 3D model, and adjusting the orientation and placement of the 3D model for a plurality of visual representations of items previously selected for use in styling the 3D virtual environment and a plurality of 3D models corresponding to the items previously selected for use in styling the 3D virtual environment.

3. The photorealistic scene generation system of claim 1, wherein the processor is configured to adjust the orientation and placement of the 3D model as moved independently from other 3D models placed within the 3D virtual environment in real time with receiving associated input from the VR controller.

4. The photorealistic scene generation system of claim 1, wherein the processor is programmed to convert the selected one of the visual representations in a manner including automatically adjusting the scale of the 3D model, as compared to the selected one of the visual representations, to match the scale of the 3D virtual environment.

5. The photorealistic scene generation system of claim 1, wherein the conversion processor is further programmed to add additional photorealistic features to photorealistic scene including one or more of light and shadow to the photorealistic scene.

6. The photorealistic scene generation system of claim 1, wherein the non-transitory computer readable storage medium is remotely located as compared to the VR processor.

7. A photorealistic scene generation system comprising:

a virtual reality (VR) headset configured to visually present a user with a three-dimensional (3D) virtual environment;

a VR controller separate from the VR headset and configured to receive input from the user during user interaction with the 3D virtual environment as viewed through the VR headset;

a VR processor in communication with the VR headset and the VR controller, the VR processor being programmed to:
  instruct the VR headset to display the 3D virtual environment having an interactive vantage point based on movement of the user based on positional data received from the VR headset,
  instruct the VR headset to display a source zone superimposed over the 3D virtual environment to the user, wherein the source zone provides visual representations of physical items previously selected for use in styling the 3D virtual environment,
  receive input from the VR controller to select and direct movement of one of the visual representations from the source zone and to move the selected one of the visual representations into the 3D virtual environment,
  convert the selected one of the visual representations into a 3D model of an item corresponding to the selected one of the visual representations as the visual representation is moved from the source zone into the 3D virtual environment, and
  in real time, adjust the orientation and placement of the 3D model within the 3D virtual environment to have an orientation and positional placement as directed by input from the VR controller;

a non-transitory computer readable storage medium for storing a photorealistic 3D model and a chunk 3D model for each one of a plurality of physical items, wherein the chunk 3D model is a less detailed representation of a corresponding one of the plurality of physical items than the photorealistic 3D model corresponding to a same one of the plurality of physical items, and the 3D model is the chunk 3D model, wherein the VR processor is further programmed to output a chunk scene from the 3D virtual environment including the chunk 3D model and additional chunk 3D models;

a conversion processor, in communication with the non-transitory computer readable storage medium, programmed to convert the chunk scene into a more nearly photorealistic scene by replacing individual ones of the chunk 3D model and the additional chunk 3D models with ones of the plurality of photorealistic 3D models from the non-transitory computer readable storage medium that corresponds to the same physical item as the chunk 3D model and the additional chunk 3D models;

a digital warehouse interface providing visual representations of a plurality of physical items each having a corresponding chunk 3D model and a corresponding photorealistic 3D model; and a selection processor in communication with non-transitory computer readable storage medium and for executing the digital warehouse interface in a manner allowing the user to select individual visual representations of physical items and to store the selected individual visual representations in a non-transitory database as a working board grouping including all of the selected individual visual representations;

wherein the visual representations of physical items previously selected for use in styling the 3D virtual environment shown in the source zone are the visual representations included in the working board grouping selected for design by the user.

8. A method of creating a photorealistic scene, the method comprising:
visually presenting a three-dimensional (3D) virtual environment to a user via a virtual reality (VR) headset as directed by a VR processor in communication with the VR headset, including presenting the 3D virtual environment having an interactive vantage point based on movement of a head of the user based on positional data received from the VR headset;
displaying a source zone to the user via the VR headset simultaneously with the 3D virtual environment as directed by the VR processor, wherein the source zone is displayed superimposed over the 3D virtual environment and provides visual representations of physical items previously selected for use in styling the 3D virtual environment;
receiving input from a VR controller to select and direct movement of one of the visual representations from the source zone and moving the selected one of the visual representations into the 3D virtual environment based on input received from the VR controller;
converting the selected one of the visual representations into a 3D model of an item corresponding to the selected one of the visual representations as the visual representation is moved from the source zone into the 3D virtual environment;
in real time, adjusting the orientation and placement of the 3D model within the 3D virtual environment to have an orientation and positional placement as directed by input from the VR controller;
storing a photorealistic 3D model and a chunk 3D model for each one of a plurality of physical items to a non-transitory computer readable storage medium, wherein the chunk 3D model is a less detailed representation of a corresponding one of the plurality of physical items than the photorealistic 3D model corresponding to a same one of the plurality of physical items, and the 3D model is the chunk 3D model;
outputting a chunk scene from the 3D virtual environment including the chunk 3D model and additional chunk 3D models; and
converting the chunk scene, using a processor in communication with the non-transitory computer readable storage medium, into a more nearly photorealistic scene by replacing individual ones of the chunk 3D model and the additional chunk 3D models with ones of the plurality of photorealistic 3D models from the non-transitory computer readable storage medium that corresponds to the same physical item as the chunk 3D model and the additional chunk 3D models; and
automatically converting the chunk scene into the more nearly photorealistic scene by replacing individual ones of the chunk 3D model and the additional chunk 3D models with ones of the plurality of photorealistic 3D models corresponding to the same physical item as the chunk 3D model and the additional chunk 3D models upon receipt of user input received via the VR controller indicating the chunk scene is complete.

9. The method of claim 8, further comprising repeating receiving input from the VR controller, converting the selected one of the visual representations into the 3D model, and adjusting the orientation and placement of the 3D model for a plurality of visual representations of items previously selected for use in styling the 3D virtual environment and a plurality of 3D models corresponding to the items previously selected for use in styling the 3D virtual environment.

10. The method of claim 8, further comprising adjusting the orientation and placement of the 3D model as moved independently from other 3D models placed within the 3D virtual environment based on user input received via the VR controller.

11. The method of claim 8, wherein converting the selected one of the visual representations includes automatically adjusting the scale of the 3D model, as compared to the selected one of the visual representations, to match the scale of the 3D virtual environment.

12. The method of claim 8, further comprising adding additional photorealistic features to the photorealistic scene including adding one or more of light and shadow to the photorealistic scene.

13. The method of claim 8, wherein the non-transitory computer readable storage medium is remotely located as compared to the VR processor.

14. A method of creating a photorealistic scene, the method comprising:
visually presenting a three-dimensional (3D) virtual environment to a user via a virtual reality (VR) headset as directed by a VR processor in communication with the VR headset, including presenting the 3D virtual environment having an interactive vantage point based on movement of a head of the user based on positional data received from the VR headset;
displaying a source zone to the user via the VR headset simultaneously with the 3D virtual environment as directed by the VR processor, wherein the source zone is displayed superimposed over the 3D virtual environment and provides visual representations of physical items previously selected for use in styling the 3D virtual environment;
receiving input from a VR controller to select and direct movement of one of the visual representations from the source zone and moving the selected one of the visual representations into the 3D virtual environment based on input received from the VR controller;
converting the selected one of the visual representations into a 3D model of an item corresponding to the selected one of the visual representations as the visual representation is moved from the source zone into the 3D virtual environment;
in real time, adjusting the orientation and placement of the 3D model within the 3D virtual environment to have an orientation and positional placement as directed by input from the VR controller;
storing a photorealistic 3D model and a chunk 3D model for each one of a plurality of physical items to a non-transitory computer readable storage medium, wherein the chunk 3D model is a less detailed representation of a corresponding one of the plurality of physical items than the photorealistic 3D model corresponding to a same one of the plurality of physical items, and the 3D model is the chunk 3D model;
outputting a chunk scene from the 3D virtual environment including the chunk 3D model and additional chunk 3D models; and
converting the chunk scene, using a processor in communication with the non-transitory computer readable storage medium, into a more nearly photorealistic scene by replacing individual ones of the chunk 3D model and the additional chunk 3D models with ones of the plurality of photorealistic 3D models from the non-transitory computer readable storage medium that corresponds to the same physical item as the chunk 3D model and the additional chunk 3D models;

accessing a digital warehouse interface providing visual representations of a plurality of physical items each having a corresponding chunk 3D model and a corresponding photorealistic 3D model; and selecting individual visual representations of physical items and storing the selected individual visual representations in a non-transitory database as a working board grouping including all of the selected individual visual representations;

wherein the visual representations of physical items previously selected for use in styling the 3D virtual environment shown in the source zone are the visual representations included in the working board grouping selected for design by the user.

15. A non-transitory memory storing instructions for creating a photorealistic scene, the instructions comprising:

code for visually presenting a three-dimensional (3D) virtual environment to a user via a virtual reality (VR) headset as directed by a VR processor in communication with the VR headset, including presenting the 3D virtual environment having an interactive vantage point based on movement of a head of the user based on positional data received from the VR headset;

code for displaying a source zone to the user via the VR headset simultaneously with the 3D virtual environment as directed by the VR processor, wherein the source zone is displayed superimposed over the 3D virtual environment and provides visual representations of physical items previously selected for use in styling the 3D virtual environment;

code for receiving input from a VR controller to select and direct movement of one of the visual representations from the source zone and moving the selected one of the visual representations into the 3D virtual environment based on input received from the VR controller;

code for converting the selected one of the visual representations into a 3D model of an item corresponding to the selected one of the visual representations as the visual representation is moved from the source zone into the 3D virtual environment;

code for adjusting, in real time, the orientation and placement of the 3D model within the 3D virtual environment to have an orientation and positional placement as directed by input from the VR controller;

code for storing a photorealistic 3D model and a chunk 3D model for each one of a plurality of physical items to a non-transitory computer readable database, wherein the chunk 3D model is a less detailed representation of a corresponding one of the plurality of physical items than the photorealistic 3D model corresponding to a same one of the plurality of physical items, and the 3D model is the chunk 3D model;

code for outputting a chunk scene from the 3D virtual environment including the chunk 3D model and additional chunk 3D models;

code for converting the chunk scene, using a processor in communication with the non-transitory computer readable database, into a more nearly photorealistic scene by replacing individual ones of the chunk 3D model and the additional chunk 3D models with ones of the plurality of photorealistic 3D models from the non-transitory computer readable database that corresponds to the same physical item as the chunk 3D model and the additional chunk 3D models; and code for automatically converting the chunk scene into the more nearly photorealistic scene by replacing individual ones of the chunk 3D model and the additional chunk 3D models with ones of the plurality of photorealistic 3D models corresponding to the same physical item as the chunk 3D model and the additional chunk 3D models upon receipt of user input received via the VR controller indicating the chunk scene is complete.

16. The non-transitory memory of claim 15, wherein the instructions further comprise code for adjusting the orientation and placement of the 3D model as moved independently from other 3D models placed within the 3D virtual environment based on user input received via the VR controller.

17. The non-transitory memory of claim 15, wherein the code for converting the selected one of the visual representations includes code for automatically adjusting the scale of the 3D model, as compared to the selected one of the visual representations, to match the scale of the 3D virtual environment.

18. The non-transitory memory of claim 15, wherein the instructions further comprise code for adding additional photorealistic features to the photorealistic scene including adding one or more of light and shadow to the photorealistic scene.

19. A non-transitory memory storing instructions for creating a photorealistic scene, the instructions comprising:

code for visually presenting a three-dimensional (3D) virtual environment to a user via a virtual reality (VR) headset as directed by a VR processor in communication with the VR headset, including presenting the 3D virtual environment having an interactive vantage point based on movement of a head of the user based on positional data received from the VR headset;

code for displaying a source zone to the user via the VR headset simultaneously with the 3D virtual environment as directed by the VR processor, wherein the source zone is displayed superimposed over the 3D virtual environment and provides visual representations of physical items previously selected for use in styling the 3D virtual environment;

code for receiving input from a VR controller to select and direct movement of one of the visual representations from the source zone and moving the selected one of the visual representations into the 3D virtual environment based on input received from the VR controller;

code for converting the selected one of the visual representations into a 3D model of an item corresponding to the selected one of the visual representations as the visual representation is moved from the source zone into the 3D virtual environment;

code for adjusting, in real time, the orientation and placement of the 3D model within the 3D virtual environment to have an orientation and positional placement as directed by input from the VR controller;

code for storing a photorealistic 3D model and a chunk 3D model for each one of a plurality of physical items to a non-transitory computer readable database, wherein the chunk 3D model is a less detailed representation of a corresponding one of the plurality of physical items than the photorealistic 3D model corresponding to a same one of the plurality of physical items, and the 3D model is the chunk 3D model;

code for outputting a chunk scene from the 3D virtual environment including the chunk 3D model and additional chunk 3D models;

code for converting the chunk scene, using a processor in communication with the non-transitory computer readable database, into a more nearly photorealistic scene by replacing individual ones of the chunk 3D model and the additional chunk 3D models with ones of the plurality of photorealistic 3D models from the non-transitory computer readable database that corresponds to the same physical item as the chunk 3D model and the additional chunk 3D models;

code for accessing a digital warehouse interface providing visual representations of a plurality of physical items each having a corresponding chunk 3D model and a corresponding photorealistic 3D model; and code for selecting individual visual representations of physical items and storing the selected individual visual representations in a non-transitory database as a working board grouping including all of the selected individual visual representations;

wherein the visual representations of physical items previously selected for use in styling the 3D virtual environment shown in the source zone are the visual representations included in the working board grouping selected for design by the user.

\* \* \* \* \*